United States Patent
Navali et al.

(10) Patent No.: US 11,063,995 B2
(45) Date of Patent: Jul. 13, 2021

(54) DYNAMIC PACKAGER NETWORK BASED ABR MEDIA DISTRIBUTION AND DELIVERY

(71) Applicant: TELEFONAKTIEBOLAGET LM ERICSSON (PUBL), Stockholm (SE)

(72) Inventors: Prabhudev Navali, Westford, MA (US); Raj Nair, Lexington, MA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 123 days.

(21) Appl. No.: 16/569,948

(22) Filed: Sep. 13, 2019

(65) Prior Publication Data

US 2020/0076865 A1 Mar. 5, 2020

Related U.S. Application Data

(63) Continuation of application No. 15/098,971, filed on Apr. 14, 2016, now Pat. No. 10,425,453.

(Continued)

(51) Int. Cl.
*H04L 29/06* (2006.01)
*H04N 21/2343* (2011.01)
(Continued)

(52) U.S. Cl.
CPC .......... *H04L 65/60* (2013.01); *H04L 65/4084* (2013.01); *H04L 65/601* (2013.01); *H04L 65/604* (2013.01); *H04L 65/80* (2013.01); *H04L 67/02* (2013.01); *H04L 67/104* (2013.01); *H04L 67/1008* (2013.01); *H04L 67/1031* (2013.01); *H04N 21/23439* (2013.01); *H04N 21/2662* (2013.01); *H04N 21/65* (2013.01); *H04N 21/845* (2013.01); *H04L 45/00* (2013.01); *H04L 47/365* (2013.01)

(58) Field of Classification Search
CPC ......... H04N 21/8456; H04N 21/23439; H04N 21/2662; H04N 21/26258; H04L 65/4084; H04L 67/02; H04L 65/80; H04L 65/602; H04L 65/60
See application file for complete search history.

(56) References Cited

U.S. PATENT DOCUMENTS 9,716,903 B2 * 7/2017 Cardona ............ H04N 21/2181
2008/0115194 A1 5/2008 Apostolopoulos
(Continued)

FOREIGN PATENT DOCUMENTS

| JP | 2010517138 A | 5/2010 |
| WO | 2012167106 A1 | 12/2012 |
| WO | 2013098319 A1 | 7/2013 |

OTHER PUBLICATIONS

Wang et al., "Joint Online Transcoding and Geo-distributed Delivery for Dynamic Adaptive Streaming", IEEE INFOCOM 2014.

*Primary Examiner* — Austin J Moreau

(57) ABSTRACT

A method, system and non-transitory computer-readable medium for distributing adaptive bitrate (ABR) media are disclosed. The method includes initially ingesting a first ABR media element at a first network node and receiving, at the first network node, a second ABR media element that was initially ingested at a second node. The method further includes initiating distribution of the first and second ABR media elements from the first network node to a first plurality of network nodes.

18 Claims, 15 Drawing Sheets

Related U.S. Application Data

(60) Provisional application No. 62/149,153, filed on Apr. 17, 2015.

(51) Int. Cl.
    *H04N 21/2662*    (2011.01)
    *H04N 21/65*    (2011.01)
    *H04N 21/845*    (2011.01)
    *H04L 29/08*    (2006.01)
    *H04L 12/805*    (2013.01)
    *H04L 12/701*    (2013.01)

(56) References Cited

U.S. PATENT DOCUMENTS

| | | |
|---|---|---|
| 2008/0155059 A1 | 6/2008 | Hardin et al. |
| 2008/0172718 A1 | 7/2008 | Bradley |
| 2010/0022244 A1 | 1/2010 | McKibben |
| 2010/0242079 A1* | 9/2010 | Riedl ............... H04N 7/17318 725/115 |
| 2011/0107379 A1 | 5/2011 | Lajoie et al. |
| 2011/0196973 A1 | 8/2011 | Shaheen et al. |
| 2012/0265901 A1 | 10/2012 | Swenson et al. |
| 2013/0152143 A1 | 6/2013 | Carney et al. |
| 2013/0226992 A1 | 8/2013 | Bapst et al. |
| 2014/0109153 A1 | 4/2014 | Venkatraman et al. |
| 2014/0250230 A1 | 9/2014 | Brueck et al. |
| 2014/0280750 A1 | 9/2014 | Panje et al. |
| 2014/0359140 A1 | 12/2014 | Shankarraman |
| 2015/0012656 A1 | 1/2015 | Phillips et al. |
| 2015/0100703 A1 | 4/2015 | Begen et al. |
| 2015/0172731 A1* | 6/2015 | Hasek ............... H04N 21/454 725/28 |
| 2015/0334153 A1 | 11/2015 | Koster et al. |
| 2016/0044078 A1 | 2/2016 | Hosur |
| 2016/0164841 A1 | 6/2016 | Mikhailov et al. |

\* cited by examiner

DYNAMIC PACKAGER NETWORK BASED ABR MEDIA DISTRIBUTION AND DELIVERY

PRIORITY CLAIM

This application is a continuation of pending U.S. application Ser. No. 15/098,971, filed Apr. 14, 2016, which claims the benefit of U.S. Provisional Application No. 62/149,153, filed Apr. 17, 2015, the disclosures of which are fully incorporated herein by reference.

FIELD OF THE DISCLOSURE

The present disclosure generally relates to communication networks. More particularly, and not by way of any limitation, the present disclosure is directed to a system and method for providing dynamic packager network based adaptive bitrate (ABR) media distribution and delivery in a network environment.

BACKGROUND

Content providers have long struggled with how to provide content at a high availability and high performance to their customers in view of bandwidth limitations in content distribution networks. A Content Delivery Network (CDN) can be a large distributed system of servers deployed in multiple data centers connected to the Internet or other public/private communication network. The goal of a CDN is to serve media content (e.g., video/audio/etc.) to User Equipment nodes (UEs) with high availability and high performance. Example UEs that can receive media content are set-top boxes, television, multimedia computers, and wireless terminals (e.g., smartphones and tablet computers).

The bandwidth requirements for distributing content from content providers to central CDN servers and/or to distributed Edge replication servers have grown tremendously with the proliferation of adaptive streaming content delivery solutions. Adaptive streaming technology is being implemented to handle increasing consumer demands for streaming content from Over The Top (OTT) applications on OTT content servers (e.g., broadcast and on demand movies/TV, etc.) across one or more CDNs to UEs having widely differing performance and protocols. Example adaptive streaming technology that continues to be developed includes Apple initiated HTTP Live Streaming (HLS) protocol, Microsoft initiated Smooth Streaming (SS) over HTTP protocol, Adobe initiated Dynamic Streaming protocol, MPEG Dynamic Adaptive Streaming over HTTP (MPEG DASH) protocol, etc. Further developments are needed to allow media to be distributed widely at the lowest cost in bandwidth and resources.

SUMMARY

The present patent disclosure is broadly directed to systems, methods, and associated non-transitory computer-readable media for facilitating optimized ABR media distribution and delivery. The disclosed system and method combine peer-to-peer sharing of content and dynamic adaptive media distribution with the control mechanisms to ensure that requirements such as licensing, quality of service (QoS), business constraints, etc. are met while spreading the workload across the network. Peer-to-peer sharing of ABR media allows any packager in the core network to ingest ABR media and to distribute both that ABR media and ABR media ingested at other packagers. The distribution is controlled by a common entitlement system that propagates the entitlement controls from the primary origins to the remote origins, potentially passing through intermediate nodes. Dynamic adaptive media distribution allows resources to be optimized as requirements on the system evolve. Adaptive distribution allows the ability to instantiate new packager nodes, to dynamically change which packagers are providing specific media, and to adapt routing on the fly to meet changing customer demands.

In order to provide control over the dynamic nature of the network, a Service Manifest (SM) is provided by a Service Manifest Controller (SMC) to a network of packagers that share the packaging workload. The Service Manifest provides constraints that direct operations related to routing, packaging, delivery, content protection, entitlements, etc., allowing Video on Demand (VoD) and channels to be served from one or more network nodes determined to be optimal at providing packaging within the provided constraints. Media may be packaged close to a local region where the media is consumed.

In one aspect, an embodiment of a method for distributing ABR media is disclosed. The method comprises, inter alia, initially ingesting a first ABR media element at a first network node; receiving, at the first network node, a second ABR media element that was initially ingested at a second node; and initiating distribution of the first and second ABR media elements from the first network node to a first plurality of network nodes.

In a related aspect, an embodiment of a system comprising a plurality of network nodes for distributing ABR media is disclosed. The system is configured, inter alia, to initially ingest a first ABR media element at a first network node; receive, at the first packager, a second ABR media element that was initially ingested at a second network node; and initiate distribution of the first and second ABR media elements to a first plurality of nodes in a peer-to-peer manner.

In a further related aspect, an embodiment of a non-transitory computer-readable medium having a sequence of program instructions which, when executed by a processor, perform a method for distributing ABR media is disclosed. The method executed includes, inter alia, initially ingesting a first ABR media element at a first network node; receiving, at the first network node, a second ABR media element that was initially ingested at a second node; and initiating distribution of the first and second ABR media elements from the first network node to a first plurality of network nodes in a peer-to-peer manner.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1A:
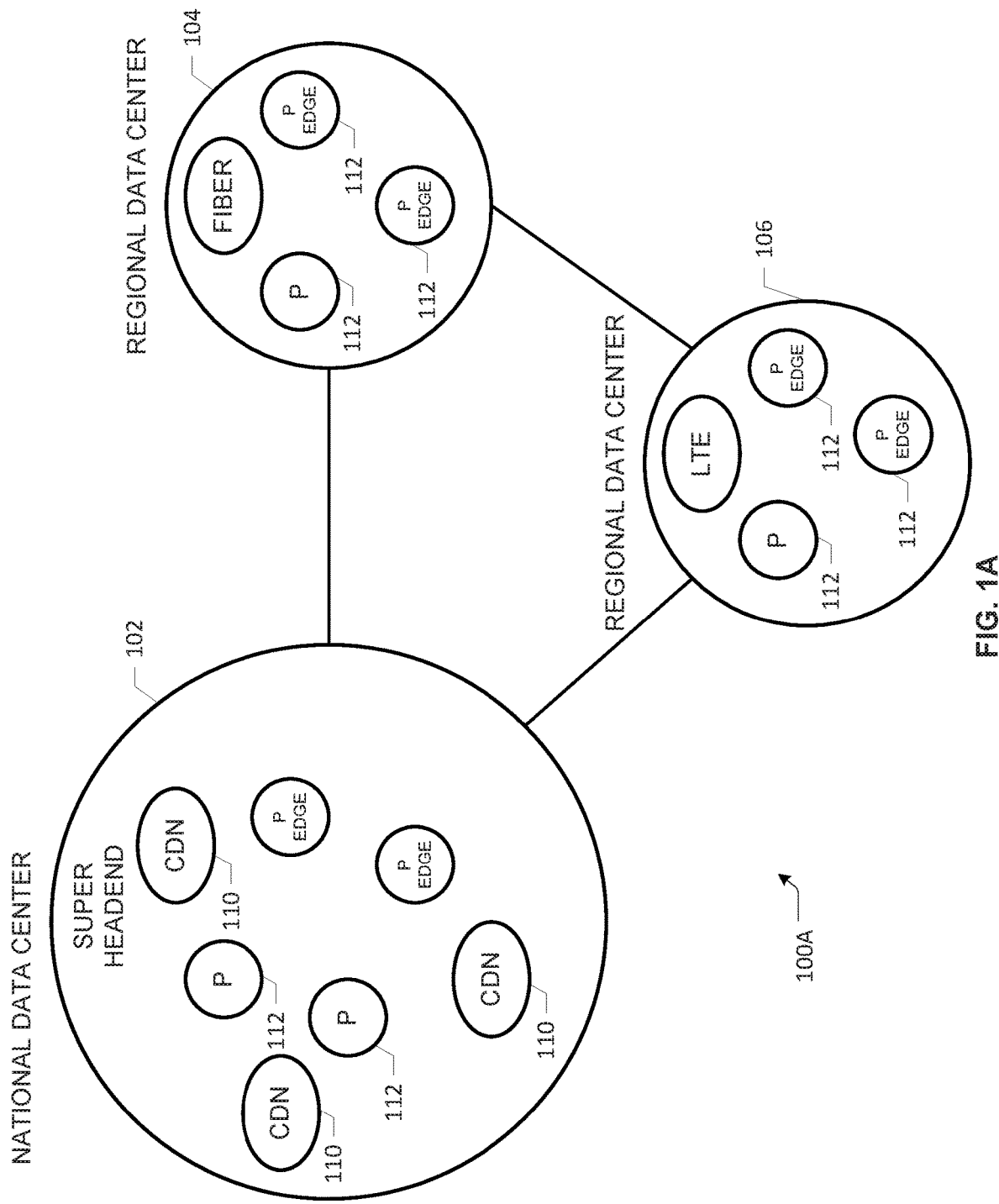
FIG. 1A depicts a generalized media network in which the disclosed embodiments can operate.

In the following description, numerous specific details are set forth with respect to one or more embodiments of the present patent disclosure. However, it should be understood that one or more embodiments may be practiced without such specific details. In other instances, well-known hardware/software subsystems, components, structures and techniques have not been shown in detail in order not to obscure the understanding of the example embodiments. Accordingly, it will be appreciated by one skilled in the art that the embodiments of the present disclosure may be practiced without having to reference one or more such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services, either in a virtualized or non-virtualized environment, with respect to a plurality of subscribers and associated user equipment that are operative to receive/consume content in a network infrastructure adapted for streaming media content using one or more of a variety of access networks, transmission technologies, architectures, streaming protocols, etc. As such, some network elements may be disposed in a wireless radio network environment whereas other network elements may be disposed in a public packet-switched network infrastructure, including or otherwise involving suitable content delivery network (CDN) infrastructure. Further, suitable network elements operative with one or more embodiments set forth herein may involve terrestrial and/or satellite broadband delivery infrastructures, e.g., a Digital Subscriber Line (DSL) architecture, a Data Over Cable Service Interface Specification (DOCSIS)-compliant Cable Modem Termination System (CMTS) architecture, a suitable satellite access network architecture or a broadband wireless access network architecture, and the like. Additionally, some network elements in certain embodiments may comprise "multiple services network elements" that provide support for multiple network-based functions (e.g., A/V media delivery policy management, session control, QoS policy enforcement, bandwidth scheduling management, subscriber/device policy and profile management, content provider priority policy management, streaming policy management, and the like), in addition to providing support for multiple application services (e.g., data and multimedia applications). Example subscriber end stations or client devices may comprise a variety of content recording, rendering, and/or consumption devices operative to receive media content using a plurality of media delivery or streaming technologies. Accordingly, such client devices may include set-top boxes (STBs), networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) and the like, which may access or consume content/services provided via a suitable high speed broadband connection in combination with one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Adaptive streaming technology converts a source media content stream into a plurality of content streams having different coding bit rates. A group of multiple bit rate content streams may be transcoded to provide a plurality of groups of multiple bit rate content streams having different distribution container formats that can be required by different streaming protocols used by UEs (e.g., HLS protocol, Smooth Streaming protocol, Dynamic Streaming protocol, MPEG DASH protocol, etc.). Accordingly, a single group of multiple bitrate content streams can result in numerous groups of differently formatted multiple bit rate content streams that need to be distributed and stored at a central CDN server and/or distributed to Edge replication servers to enable high availability and high performance delivery to many different types of UEs.

An example adaptive streaming server system may be configured to accept media content from live sources and/or static file sources, e.g., online content providers such as Hulu®, Netflix®, YouTube®, or Amazon® Prime, etc. Media content from live sources may comprise live programming captured relative to any type of event, e.g., sporting/entertainment/gaming events, concerts, live TV shows, live news broadcasting, etc. In general operation, the example streaming server system may be configured, under the control of one or more processors executing appropriate program code stored in a persistent memory module, to effectuate adaptive streaming of content as follows. Initially, source media content is transcoded or otherwise encoded with different bit rates (e.g., multi-rate transcoding) using applicable encoder(s). For example, content of a particular program may be transcoded into five video files using variable bit rates (or, synonymously "bitrates" or "resolutions"), ranging from low to high bit rates (500 Kbps to 10 Mbps, by way of illustration). The particular content is therefore encoded as five different "versions" or "formats", wherein each bitrate is called a profile or representation. A segmentation server or Segmenter is operative to divide each version of the encoded media content into fixed duration segments or chunks, which are typically between two and ten seconds in duration, thereby generating a plurality of chunk streams. One skilled in the art will recognize that shorter segments may reduce coding efficiency whereas larger segments may impact the adaptability to changes in network throughput and/or fast changing client behavior. Regardless of the chunk size, the segments may be Group-of-Pictures (GOP)-aligned such that all encoding profiles have the same segments. One or more suitable metadata files referred to as Manifest Files are then created that describe the encoding rates and Uniform Resource Locator (URL) pointers relative to the various segments of encoded content. Media segments may therefore be packaged based on applicable streaming protocols for delivery/distribution. It should be appreciated that traditional architectures do not provide adaptation of media or content channels to different regions, capacity, network load and other constraints.

As will be seen below, content may be delivered using either multicast ABR techniques or unicast ABR techniques. In a unicast delivery, a subscribing receiver may be provided with a direct and unique two-way path through the delivery network all the way back to a serving media server supplying the required data stream. The main streaming activity is managed on a one-to-one basis between the receiver and the source server in a communication session. The network between the source server and receiver may typically comprise a series of intermediate servers installed at network nodes, which may not be directly involved in the service but only support the transfer of a packet stream. Typically, the protocols used to support the transmissions are simple forms of Internet Protocol (IP) itself augmented by one or more higher-layer protocols to provide flow control. These protocols extend across the span of the link between the source server and a given receiver.

A unicast system can support ABR streaming, which allows some form of rate adaptation. A given service may be encoded at a selection of different bitrates (known as representations), with synchronised boundary points at defined locations (e.g., every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system may require a unicast two-way path between source and receiver to request files and deliver the requested files.

Multicast delivery makes more efficient use of bandwidth by sharing content streams among several receivers. Intermediate network elements (e.g., routers or switches) are now more closely involved in the service delivery such that some control and management functions are delegated from the source server. This control is supported by more extensive protocols devised for this type of application such as Protocol Independent Multicast (PIM) and Internet Group Multicast Protocol (IGMP). When a new receiver requests a given media item, the network router system finds an existing stream of that content already in the network and directs a copy of it to that new receiver from a serving cable headend or an appropriately proximal network node in an edge distribution network. The requesting receiver may be provided with the capability to join this existing stream under controlled conditions that do not adversely affect existing receivers. Any receiver in this group may also be able to leave the stream or to pause in consumption without affecting the others. Additionally, there may be an implementation where a video pipe delivering services to a premises is operative to deliver content to one or more progressive download ABR clients of the premises that are designed to receive the video in bursts.

Figure 8A:
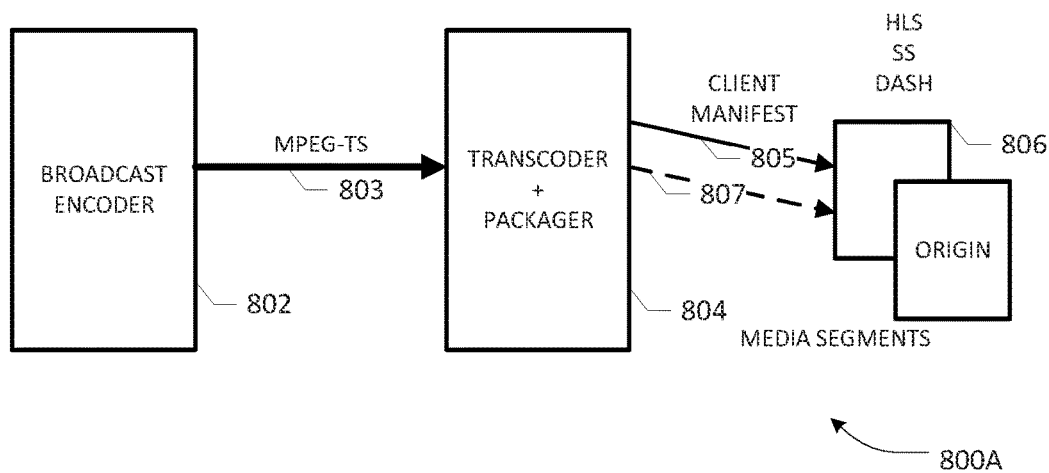
FIGS. 8A-8B depict networks for distributing ABR media in a network according to the known art.

Referring now to the drawings and more particularly to FIG. 8A, depicted therein is an example of a traditional packaging model 800. Broadcast Encoder 802 provides a media stream 803 to Transcoder/Packager 804. Media stream 803 is encoded in an MPEG-TS format containing a single bitrate. The transcoder portion of Transcoder/Packager 804 takes the MPEG-TS stream and produces multiple bitrate levels. The packager portion of Transcoder/Packager 804 then encapsulates the media in appropriate containers based on applicable streaming protocols, such as DASH, HLS, SS, etc. The resulting ABR media stream 807 and client manifest 805 are provided, e.g., to Origin 806 in desired formats, here shown as HLS, SS and DASH. Origin 806 may be an edge node or a higher level content distribution node in a CDN and is accessible by a client to receive the desired media. This centralized data center deployment model can use public or private CDNs and encompasses a limited user set with fixed channels and VoD media configuration, i.e., all clients receive channels or media catalog having identical content. Transcoder and packager resources 804 are manually provisioned and there can be no adaptation of media or channels to meet differing needs in regions, capacity, network load, etc.

Figure 8B:
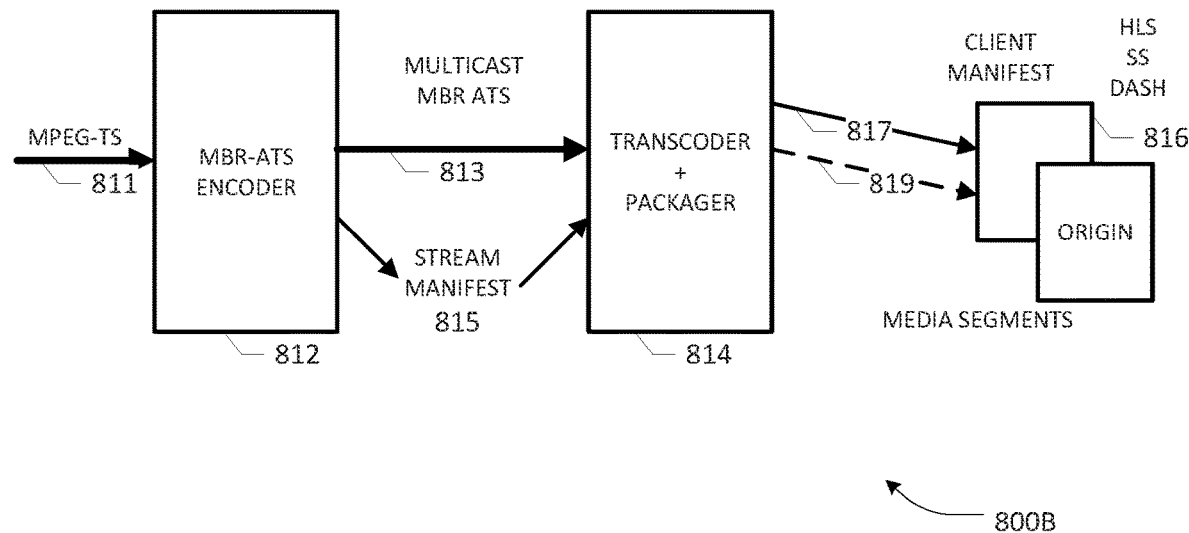

FIG. 8B provides a similar packaging model 800B for Multicast Multi-Bitrate (MBR) Adaptive Transport Stream (ATS) data. MBR ATS Encoder 812 receives an MPEG-TS stream and again provides a single bitrate multicast MBR ATS stream to Transcoder and Packager 814. In addition, MBR ATS Encoder 812 also provides Stream Manifest 815 to Transcoder and Packager 814. Stream Manifest 815 controls transportation of the ATS between MBR ATS Encoder 812 and Transcoder and Packager 814 and provides information regarding the nature of the multicast stream, e.g., identifying Encoder Boundary Points (EBP). Transcoder and Packager 814 then provides media segments 819 and client manifest 817 in desired formats to Origin 816.

Figure 9:
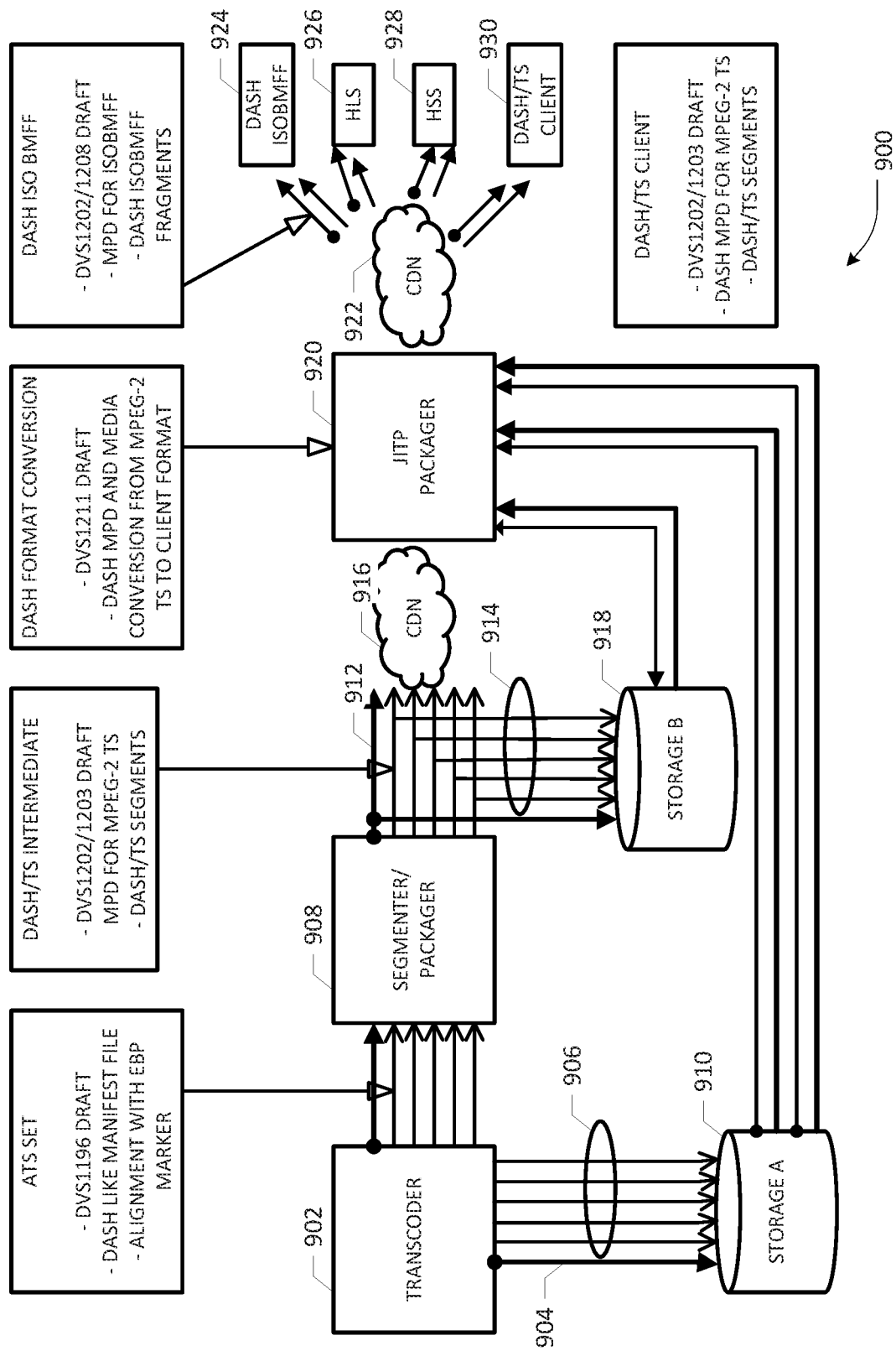
FIG. 9 depicts a network for distributing ABR media according to the known art.

FIG. 9 depicts another network for distributing ABR media according to the known art, which in the example shown follows the Society of Cable Telecommunications Engineers (SCTE) Standard 1206 for DASH ABR reference architecture. In Network 900, Transcoder 902 receives both live streaming media and VoD (not specifically shown) and outputs an ATS set according to the Digital Video Subcommittee (DVS). The ATS set contains both a Manifest 904 and Multiple Bitrate Streams 906 of the input media, which now contain Encoder Boundary Point (EBP) structures. The ATS set can be sent directly to a Segmenter/Packager 908 or sent to a cache, such as Storage A 910.

Segmenter/Packager 908 segments the input streams and packages the streams in an intermediate format based on DASH/TS. Segmenter/Packager 908 provides Manifest 912 and media streams 914 either directly to CDN 916 or Storage B 918. Just-in-Time Packaging (JITP) Packager 920 receives manifest and streams from any of CDN 916, Storage A 910 and Storage B 918 and performs conversions of the DASH format streams into specific client formats. These client formats are sent to CDN 922, where both manifests and media streams are sent to various clients, such as DASH ISOBMFF Client 924, HLS Client 926, HSS Client 928 and DASH/TS Client 930.

In response to the skyrocketing requirements for providing media, Applicant has envisioned an improved overall architecture for the distribution and delivery of ABR media as shown in FIG. 1A. In the context of this application, "distribution" is generally used to describe the provisioning of media within the core network and out to the edge servers, while "delivery" of the media takes place between the edge server and the client. As seen in this figure, network 100A includes a Super Headend 102, which in this instance is a National Data Center, and Regional Data Centers 104, 106. It will be understood that the number of regional data centers, packagers, CDN, etc. are for illustration only and can include any number of these elements. National Data Center 102 is connected to each of Regional Data Centers 104, 106 and Regional Data Centers 104, 106 are connected to each other and to other regional data centers (not specifically shown). National Data Center 102 includes CDNs 110 and Packagers 112, some of which are edge packagers that provide media to clients. All packagers are potentially edge packagers, although they may not be used as such in all instances. Regional Data Center 104 is in a Fiber network and Regional Data Center is in a Long-Term Evolution (LTE) network; both contain Packagers 112, which may include both edge packagers and non-edge packagers. The media provided to clients can originate at multiple points within network 100A and can be exchanged across boundaries, such as between Regional Data Centers 104, 106, as well as with Super Headend 102. The connections between Super Headend 102 and Regional Data Centers 104, 106 allow an exchange of both media and control information, such as entitlements and business arrangements necessary for complying with all restrictions placed on the media being exchanged. The data centers shown are further expanded into a layer of local or edge data centers, which are not illustrated here for simplicity and to concentrate on the distribution side of the network. Regionalization of the media, e.g., for blackouts or local advertising, can take place at these edge data centers.

The disclosed network can be used to implement the dynamic adaptive media distribution disclosed herein, providing a control plane architecture that enables distributed media packaging and origination. This control plane architecture supports media distribution across multiple regions and multiple providers, as well as localization, e.g., for ad insertion and blackout. The architecture supports the routing of both live channels, channel bundles and a VoD catalog (including Network Digital Video Recorder (nDVR) and Catchup stored media) and can be used to provide dynamic and adaptive cloud-based packager orchestration. The dynamic roll-up and distribution of service and network level analytics is provided to support the dynamic, adaptive nature of this model.

As mentioned above and explained in greater detail below, guidelines to facilitate the collaboration are carried in a Service Manifest that can be associated with, for example, a channel, channel bundle or a group of VoD media elements (i.e., a catalog or sub-catalog). In at least one embodiment, a given Service Manifest is applied, for example, to all VoD and/or channels from a given studio. The Service Manifest is created by an SMC at the time the media is ingested and can be modified as it is passed through the network. SMCs are coupled both to the packagers they control and also to other SMCs. SMCs can collaborate to provide channel/catalog routing and content peering across delivery domains and can orchestrate the provision of service within constraints provided by resources, business logic and analytics.

To facilitate multi-domain delivery, SMCs engage in peer-to-peer exchanges both with inter-domain SMCs in a single provider network or across multiple-provider networks. The SMCs can exchange summary service manifests at boundary routers, where the SMC may provide a summary or aggregation of business rules. These summary service manifests can be used to exchange entitlements and information on SLAs made by downstream providers for the ABR media. The summary manifests can also be used to provide ABR media analytics regarding the delivery of the ABR media back to the provider network. The SMCs may also exchange channel bundles and sub-catalogs. A logical transport control function provides an abstraction that works across different types of transport, e.g. LTE, DSL, or cable, and allows optimization of the media using service manifest manipulation. Within the logical transport control function, a convergence layer abstracts out the particulars of the specific transport type and allows each network to determine how best to deliver the associated media. Within each type of transport, provider-controlled manipulation of the Service Manifest can be used to optimize service for the region. Media format is converted when crossing transport types and network analytics are collected and rolled up for distribution. Multiple domains are currently able to share information within an organization; the disclosed embodiments expand this capability to different providers working together. The service manifest provides a vehicle that defines business logic, entitlements, Service Level Agreements (SLAs) and exchanges between domains, such that SMCs belonging to two different companies can operate on the same service manifest.

Figure 1B:
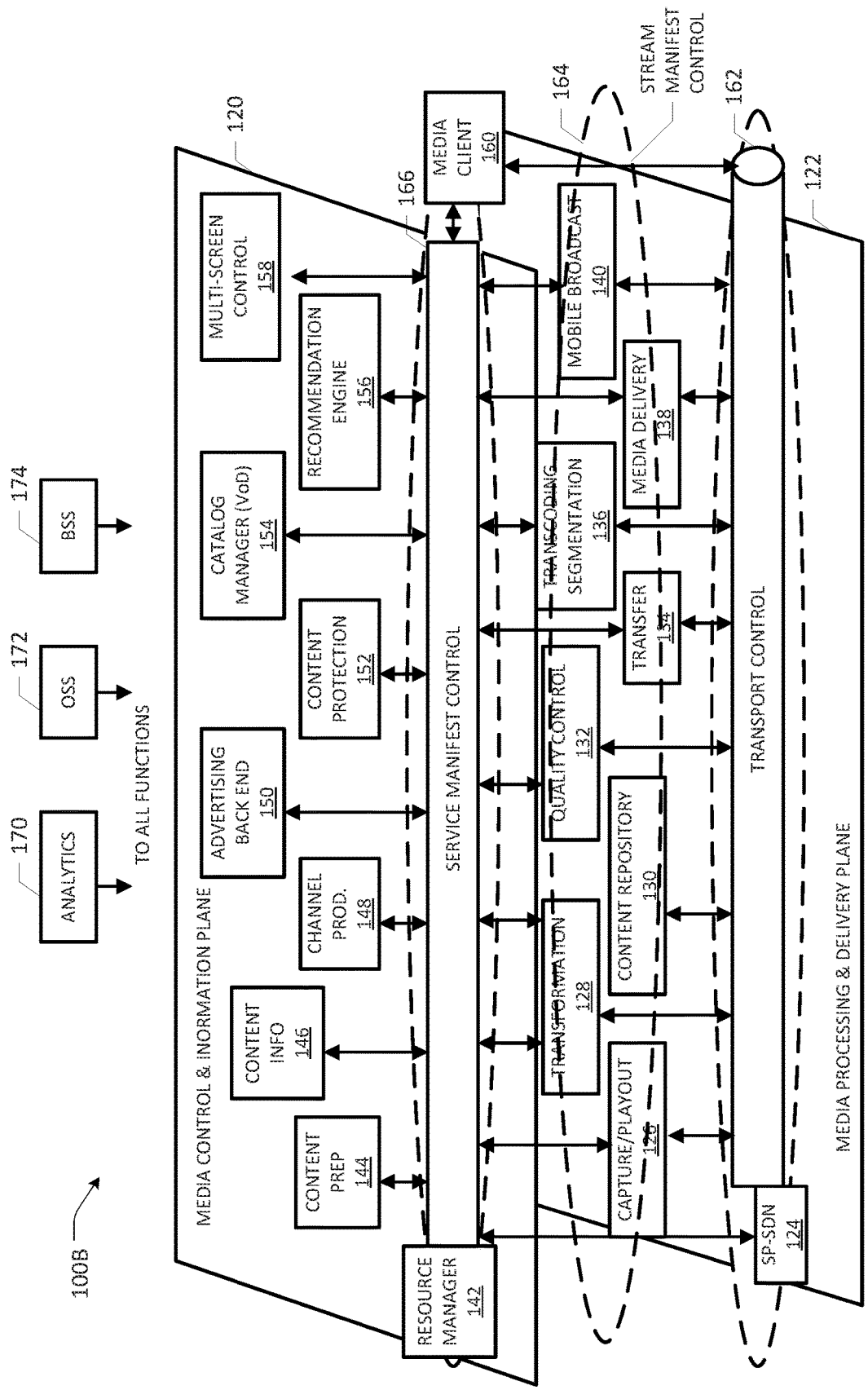
FIG. 1B depicts a functional view of the architecture for a media network in which the disclosed embodiments can operate.

FIG. 1B provides a functional view of the overall architecture of the network 100B. Functionally, network 100B operates on two planes: Media Processing and Delivery Plane 122, in which the media stream is processed and prepared for presentation to the client, and Media Control and Information Plane 120, in which overall control of the network and distribution of the media is managed. The functional entities in Media Processing and Delivery Plane 122 includes Service Provider Software Defined Network 124, which manages programmable dynamic network automation including network and cloud management, Capture/Playout 126, Transformation 128, which provides enhanced video experiences by adapting media across any device or application, Content Repository 130 (i.e., storage), Quality Control 132, Transfer 134, Transcoding and Segmentation 136, Media Delivery 138 and Mobile Broadcast 140. Media Control and Information Plane 120 provides end-to-end control of the network and includes functional entities such as Resource Manager 142, Content Preparation 144, Content Information 146, Channel Production 148, Advertising Back End 150, Content Protection 152, Catalog Manager (for VoD) 154, Recommendation Engine 156 and Multi-Screen Control 158. Media Client 160 can be part of a UE or virtualized on the network; Media Client 160 receives input from a user on a device and interfaces with both Media Processing and Delivery Plane 122 and Media Control and Information Plane 120. Functional entities for Analytics 170, Operations Support Systems (OSS) 172 and Business Support Systems (BSS) 174 interact with all functions on both planes.

Distribution and delivery of media is managed at three levels within this architecture. At the lowest, i.e., physical, level is Transport Control 162, which uses, e.g., TCP or other protocols for the physical layer to transport the media. On top of the physical layer there is Stream Manifest Control 164, which operates at the HTTP level (e.g., for HLS or DASH). The stream manifest sent with the media, also referred to as a client manifest, tells a client device how the stream has to be processed for presentation to a user. Service Manifest Control 166 serves to provide end-to-end control of the media within the network. A service manifest is concerned with control of the stream and is used to provide information that can relate to any phase in the distribution and delivery of the media, such as entitlements associated with the media, limitations on how the media is to be prepared, etc., so that the actual control of the media is decentralized.

Entitlements, in the context of media distribution and delivery, refer to the business rules that define the relationship between the media and the user, i.e., how the media can be consumed. Entitlements can include who may access the media, when and where and requires the correlation of subscriber, content rights, and the delivery end point or device. In order to manage entitlement across a distributed network, identification must be normalized for both content and user across the network and analytics must be propagated throughout the network. Service Manifest Control 166 is specifically concerned with entitlements associated with the content, i.e., with channels and VoD.

Channels have traditionally had a static binding with their associated content, such that a specific channel looked the same everywhere that the channel was available. In the disclosed embodiments, channels can now take on a more dynamic nature with regard to content. A channel that is produced by the national data center, for example, may have variations in different regions, such as the local insertion of advertising, substitution of programs in different regions and the possibility of providing "simulcasts", i.e., broadcast of a local event such as a graduation ceremony, local sporting event, etc., either as a substitution of a program on a specific channel or even as the provision of a separate channel that is available only for the duration of the event and thus time-limited. The inclusion of such local variations needs to be governed by business rules and other regulations that control the presentation according to network policies.

These new types of information can be carried across the network by the service manifest, which can be creates by a network entity that provides the media, modified to fit needs across the network, and used during distribution and delivery of the media to provide guidance and enforce compliance. Where a stream manifest is a network element that controls bitrates, formats, and the associated resources, the service manifest is an element that is all about end to end control and the creation of entitlement. SMCs, which create and interact with the service manifests, can be created at multiple locations across the network. Typically, each regional data center with have one or more SMCs. Additional SMCs may be created for any portions of the network where it is desired to provide business rules for a specific part of the network For example, downstream manifest controllers may be created for:

Crossing from the super head end to regional head ends;
Crossing from the core network to the edge network;
Crossing from one network administrative domain to another;
Between wireline and wireless networks; and
Between wholesale and access networks.

In the disclosed ABR media distribution model a dynamic network of packagers is used to distribute the media/channels, including across multiple domains, which can be controlled by different organizations. With the increased consumption of ABR media/channels, some of the media/channels need to be served from a location close to local regions. Packagers and CDNs can be distributed in both central and regional data centers, allowing the same media catalog/channels to be served from both the central and the regional data centers. For a given channel, each region may have a different stream and different requirements with regard to service, format, content protection, ad insertion, storage and metadata. These variations can be met using dynamic orchestration and delivery of the media catalog and channels with Constraints Based Routing (CBR).

Intelligent path selection based on multiple constraints and/or on packet content takes various factors (e.g., with a view to adaptation of content to different regions, network capacity, load, etc.) into consideration, in addition to dynamically configuring existing packagers, adding or deleting packagers, and/or instantiating new packager instances at one or more hierarchical levels in an end-to-end path. CBR as set forth herein denotes a class of higher-layer routing algorithms that base path selection decisions on a set of requirements or constraints (business rules, SLAs, subscriber-based policies, content provider policies, etc.), in addition to the destination and QoS constraints. These constraints may be imposed by administrative policies, or by QoS requirements. Constraints imposed by policies may be referred to as policy constraints, and the associated routing may be referred to as policy routing (or policy-based routing). Constraints imposed by QoS requirements, such as, e.g., bandwidth, delay, or loss, may be referred to as QoS constraints, and the associated routing may be referred to as QoS routing. CBR-based embodiments herein may consider flow aggregates (also known as macro-flows or trunks) and/or individual micro-flows (e.g., a single hypertext transfer protocol (HTTP) connection).

At least portions of the network may involve suitable TCP/IP/UDP-based routing protocols according to known standards and specifications. Illustratively, some portions of the network environment may involve a router network based on link-state protocols such as the Intermediate System-to-Intermediate System (IS-IS) routing protocol, Open Shortest Path First (OSPF) routing protocol, etc., and/or distance-vector routing protocols, which can be grouped as Interior Gateway Protocols (IGP) that may be used for routing information within a domain or autonomous system (AS) or as Exterior Gateway Protocols (EGP) that may be used for determining network reachability across multiple domains that may span an end-to-end path. Advantageously, in some example embodiments, a channel/catalog routing protocol in a packager network may comprise advertisement messages similar to link-state advertisements in OSPF, but adapted to operate at a higher layer (e.g., application layer) of the stack.

In at least one embodiment, the routing is based on protocols from an Information Centric Networking (ICN) architecture, which is also known as Content Centric Networking. Content Centric Networking (CCN) emphasizes content (ABR Media) by making it directly addressable and routable. In this embodiment, CCN routing protocols will be used to distribute the constraints and to build the ABR media channel or media catalog routing databases.

Figure 2:
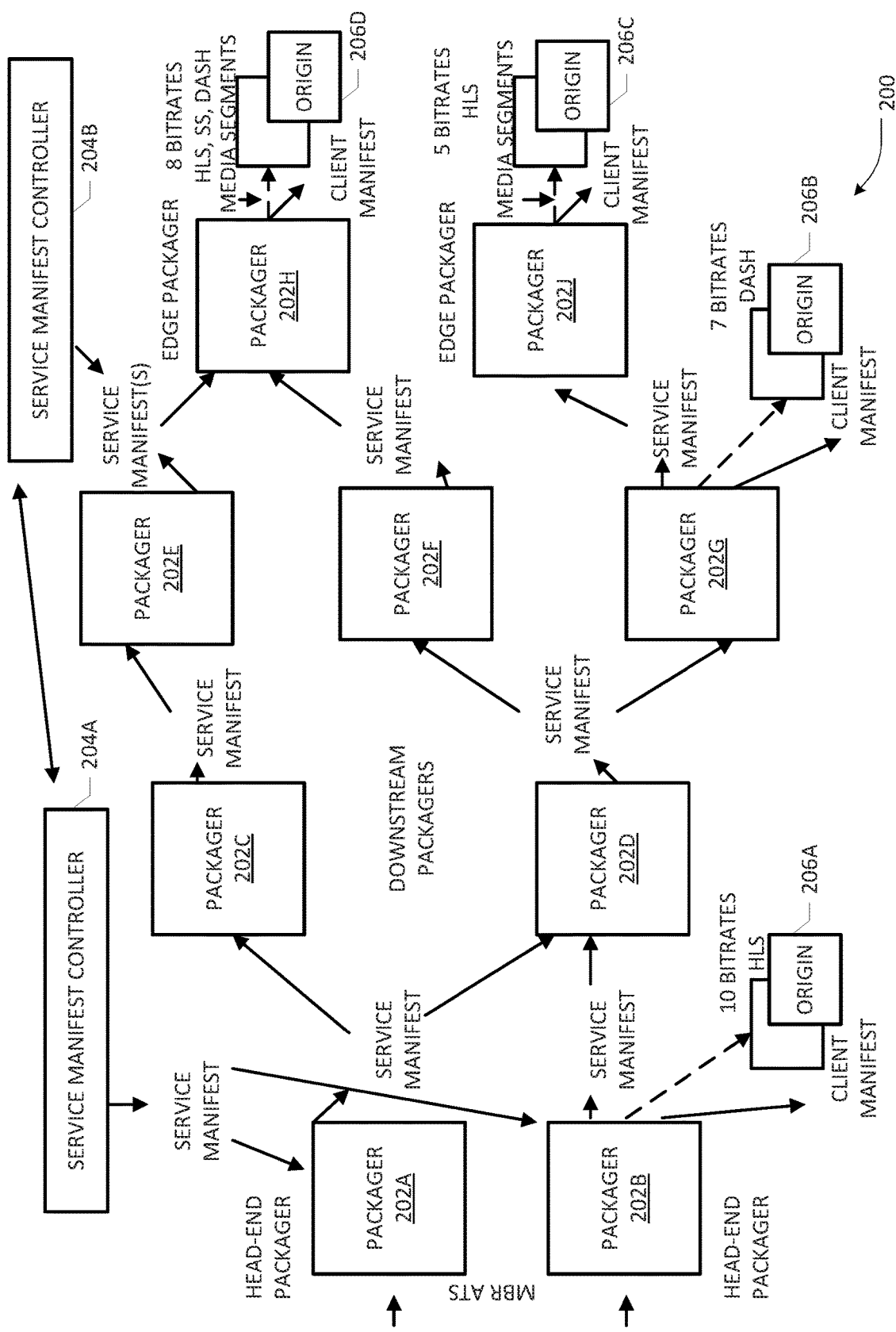
FIG. 2 depicts a network of packagers operating in a peer-to-peer relationship and a network of service manifest controllers associated therewith according to an embodiment of the present patent disclosure.

FIG. 2 illustrates an example network 200 of Packagers 202 and an associated network of SMCs 204. In this figure, two Headend Packagers 202A, 202B receive media in MBR ATS format and distribute the media downstream directly to Packagers 202C, 202D and from there to additional Packagers 202E, 202F, 202G, 202H, 202J, which are connected via multiple pathways. This distributed packaging provides resiliency, lower cost, and an increased ability to provide real-time service. In this model, all packagers are capable of performing any of the actions associated with packagers, e.g., packaging, transcoding, recording, transporting, JIT services, etc., as well as providing multiple different formats at the same time, but may be given different packaging tasks according to customer demand and the needs of the network. Further the tasks allocated to specific packagers can change dynamically as specific needs vary. As will be discussed in greater detail below, some packagers may be permanently allocated, but others may be instantiated to manage specific packaging tasks that are time-limited.

Applicants note that the headend packagers shown are not necessarily at the national data center, but may be at various locations around the network, allowing media to be ingested at diverse locations and shared with the rest of the network according to the disclosed embodiments. For example, Headend Packagers 202A, 202B can be at a boundary between two service providers, with media being shared in both directions across the boundary. It is further notable that any of the packagers can provide a client manifest and associated media to Origin Servers 206, but not all packagers need to do so. Some packagers, e.g., Packagers 202C, 202D, 202E, 202F as shown serve as intermediate packagers to help manage the packaging in the most efficient manner. It will be understood that the number of packagers in a region can be either smaller or larger than the region shown. Origin Servers 206 ingest MPEG-TS, both constant bitrate and adaptive bitrate, and provide media storage, content transformation, and streaming. Origin Servers 206 transform the streams on-the-fly to RTSP and different OTT formats, thus eliminating the need to store multiple stream formats.

One or more Service Manifest Controllers 204 interact with Packagers 202 to assist in creating an associated Service Manifests when new media is ingested. The Service Manifest can also be modified in various ways to reflect the packaging in specific regions of the network and the SMCs participate in these modifications. SMCs 204 can be configured to connect only to headend packagers or to all packagers in their region. SMCs are frequently co-located with a packager, although this is not a requirement.

Figure 3:
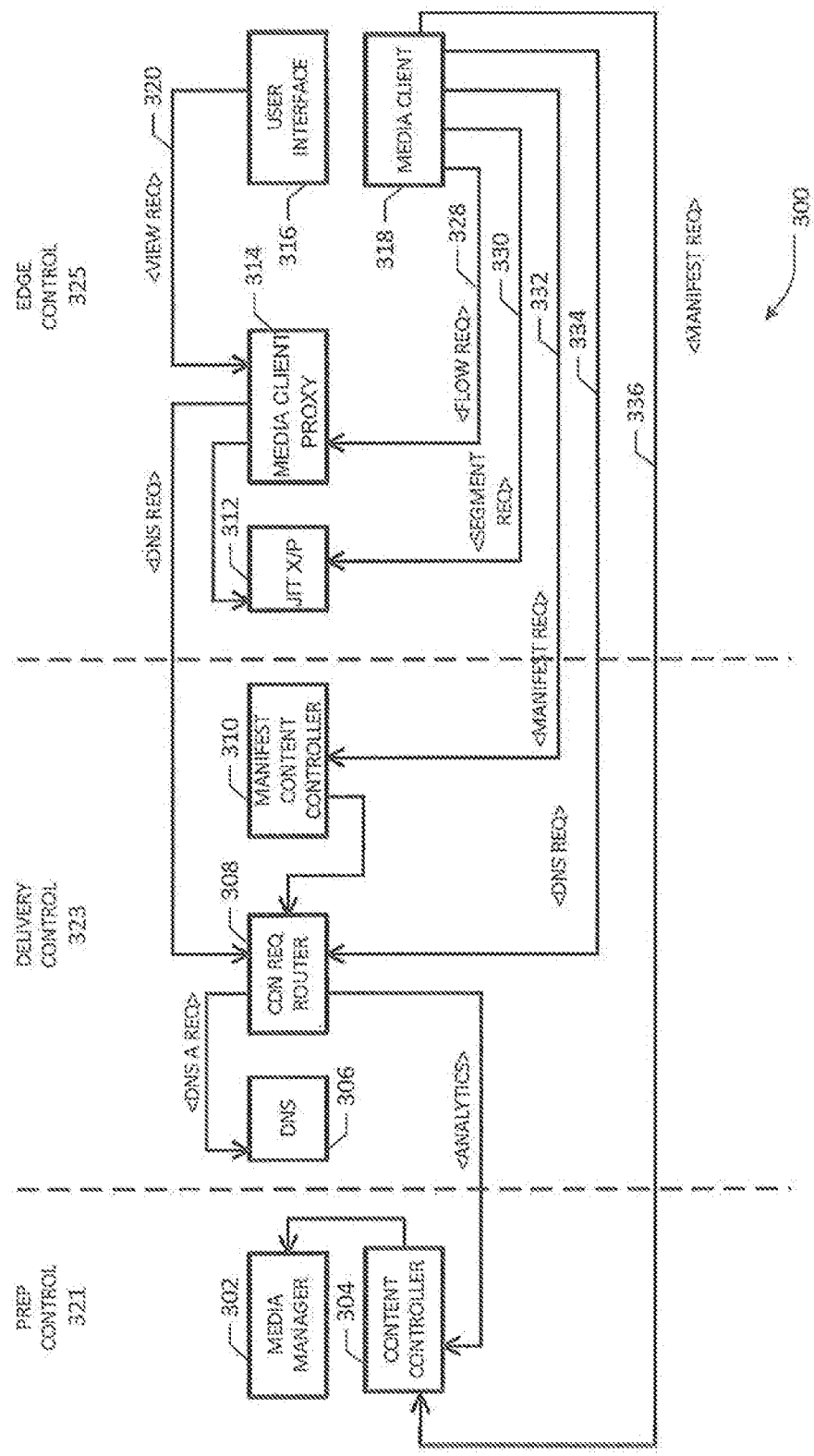
FIG. 3 depicts an example of the network structures used to deliver media to a client according to an embodiment of the present patent disclosure.

Turning next to FIG. 3, an example of the network elements used to deliver media to a client device is shown according to an embodiment of the patent disclosure. Network 300 includes elements for Preparation Control 321, Delivery Control 323 and Edge Control 325. Preparation Control 321 includes Media Manager 302 and Content Controller 304. Media Manager 302 acts as an administrator, receiving electronic programming data and subscriber information and authenticating user access based on correlating device, user and content rights; Media Manager 302 also contains the content encryption keys and manages the Service Manifest. Content Controller 304 is a Digital Rights Management (DRM) license server that interacts with client devices to support content delivery based on client requests and service mediation; Content Controller 304 will provide the Stream Manifest to the client. Delivery Control 323 includes Domain Name Server (DNS) 306, CDN Request Router 308 and Manifest Content Controller 310. DNS 306 translates or resolves human-memorable domain names and hostnames into the corresponding numeric Internet Protocol (IP) addresses. In at least one embodiment, rather than using DNS 306, the architecture utilizes HTTP redirect to perform a similar function. CDN Request Router 308 receives user requests and steers the UE to a delivery node that is close. Manifest Content Controller 310 controls the Client Manifest. Edge Control 325 includes JIT X/P 312, Media Client Proxy 314, User Interface 316 and Media Client 318. The "X/P" in JIT X/P is used to indicate that this node can be a JIT transcoder or JIT packager, depending on the functionality needed in the specific embodiment. Both User Interface 316 and Media Client 318 are part of a client device, such as a set-top box or mobile device. Media Client Proxy 314 can be in the client or in network. Media Client 318 in the client device and Media Client Proxy 314 manage authentication of a client device with a media platform, retrieve content, and provide local enforcement of digital rights management. In at least one embodiment, Media Client 318 and Media Client Proxy 314 also provide device management, entitlement enforcement, analytics, ad insertion, CDN selection and bandwidth management. User Interface 316 allows the subscriber to interact with Media Client Proxy 314. Example UEs such as would contain User Interface 316 and Media Client 318 may be operative with one or more coder-decoder (codec) functionalities based on known or hereto unknown standards or specifications including but not limited to, e.g., Moving Pictures Expert Group (MPEG)

codecs (MPEG, MPEG-2, MPEG-4, etc.), H.264 codec, High Efficiency Video Coding or HEVC (H.265) codec, and the like. In the embodiment shown, Media Manager 302, Content Controller 304 and JIT X/P 312 together can be viewed as a Packager 200 and will enable the performance of JIT Transcoder or JIT packager as needed.

The arrows in FIG. 3 indicate example information flows between the entities at the network edge. As seen on the top portion of this diagram, User Interface 316 sends a View Request (Roll Request) 320 for a channel or VoD to Media Client Proxy 314 which will be forwarded to Content Controller 304 to obtain the service details for the Media. Media Client Proxy 314 also sends information on behalf of User or Media Client to JIT X/P 312 to request allocation of resources for the subscriber request. Media Client 318 can send a Flow Request 328 to Media Client Proxy 314, a Segment Request 330 to JIT X/P 312, Manifest Request 332 to Manifest Content Controller 310, DNS Request 334 to CDN Request Router 308 and Manifest Request 336 to Content Controller 304. In this particular embodiment, Media Manager 302, Content Controller 304 and JIT X/P 312 can provide the functionality of a Packager 200 and can be a first point of contact when the client requests a channel map or a media catalog map; Media Manager 302 and Content Controller 304 can supply the current mapping.

Given the disclosed ability of the network to change a location from which any media item is served, the network needs to dynamically construct channel maps and media catalog maps. This operation is performed on the client-side based on a channel or media catalog lookup application program interface (API). In at least one embodiment, a client can contact any packager in the network to receive a channel map or media catalog map. The map may include different representations of a channel or media element that may be provided at different locations, e.g., the Spanish-language version of a channel may be accessible from a first location, while the English-language version is accessible from a second location. Other differences are, of course, also possible. In at least one embodiment, input from delivery-based CBR is used together with entitlements and business-logic to arrive at the channel map for a specific client.

One of the strengths of the disclosed delivery system is that the elements can be implemented as micro-services in the cloud and do not need to store any state information. Rather, this loosely coupled architecture can be instantiated at need and used to provide a real-time, adaptive structure at any location in the network. By instantiating the disclosed micro-services as needed, both distribution and delivery of media can be optimized. Thus, media origination services, such as provided by Origin Servers 206, can reside in any of Preparation Control 321, Delivery Control 323 or Edge Control 325 and can map to different products, be instantiated as micro-services in virtual machines, and can exercise different aspects of media origination in each location.

By providing the interconnections and end-to-end components disclosed herein, Applicants provide a scalable and cost-effective way to serve a media catalog or channel in order to improve Service Provider operational efficiency and provide adaptive, dynamic media and channel orchestration across the regions. The disclosed embodiments can support a large number of long tail VOD media catalogs and channels. Channels and media catalogs can be routed by format, content-protection, resources, service, and constraints. Channel adaptation can be based on local or regional limitations, such as load, capacity, etc. Live channels or bundles can receive JIT provisioning and VOD media catalogs can be packaged and served JIT.

The disclosed adaptive, manifest-controlled media distribution and delivery architecture provides control plane mechanisms to help simplify media preparation and delivery in the new dynamic packager network model. This architecture uses cost-effective, scalable mechanisms, adaptive channel orchestration and delivery, and adaptive VOD media/catalog preparation and delivery. The disclosed architecture defines a Service Manifest that describes the properties and metadata of the media stream and provides directives for packaging the media for delivery. This architecture uses the following mechanisms:

CBR for media preparation, i.e., constraints that govern the packaging are provided within the Service Manifest such that decisions about routing can be made across the network, rather than being localized only at the national headend;

CBR for channel orchestration, i.e., channels can be modified at local levels within the constraints provided, e.g., to provide local advertising or blackouts, even providing the instantiation of time-limited channels, all using dynamic channel orchestration; and CBR for media and channel delivery, i.e., routing constraints are also provided, offering the guidelines needed by edge nodes to provide optimized delivery to the client;

In order to provide CBR, a service manifest is defined and associated with media. The service manifest describes the stream properties and metadata of the associated media and also provides directives to package the media for delivery. The service manifest can be used to represent live channel media, both live and time-shifted, as well as VoD media and catch up media. The service manifest is a media description document and is provided as an enhanced DASH Media Presentation Document (MPD) that is consumed by the packagers, rather than the client and that has been expanded to manage distribution. The service manifest describes the MBR ATS Streams in an adaptation set, i.e., the static metadata and supplemental information related to the ATS stream, and the packaged ABR adaptation sets, so that it contains information from which the client manifest can be created, but also contains directives for downstream packagers and describes packager-related attributes. The manifest or selected portions of the service manifest are preferably protected, i.e., using encrypted binary data in the service manifest. Unlike the client manifest, which describes how the stream is to be played out for the user, the service manifest provides guidance for the allocation of resources within the network.

Figure 4:
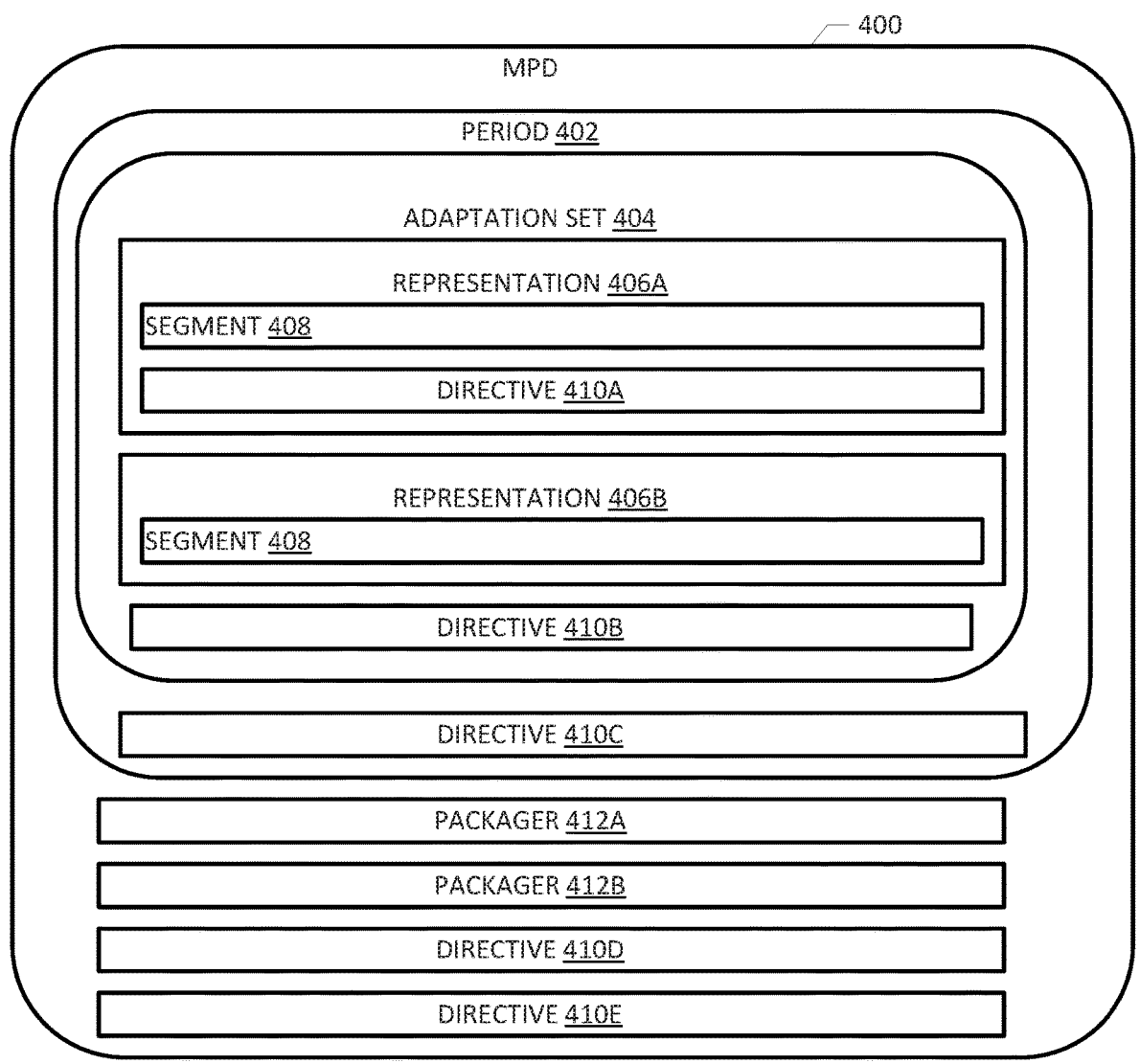
FIG. 4 depicts an example of the format for a service manifest according to an embodiment of the present patent disclosure.

Turning to FIG. 4, an example of a service manifest is shown according to one embodiment of this disclosure. As noted above, Service Manifest 400 is an MPD and contains the following elements: Period 402, Adaptation Set 404, Representation 406, Segment 408, Directive 410 and Packager 412. Period 402 describes a part of the content with a start time and duration; multiple periods can be used to separate, e.g., scenes or chapters, or advertising from program content. Adaptation Set 404 contains a media stream or set of media streams. In the simplest case, Period 402 can have one Adaptation Set 404 containing all audio and video for the content. Alternatively, each stream can be split into different Adaptation Sets. A common case is to have one video Adaptation Set, and multiple audio Adaptation Sets, e.g., one for each supported language. Adaptation Sets can also contain subtitles or arbitrary metadata. These Adaptation Sets are usually chosen by the user, or by a user agent such as a web browser or TV using the user's preferences for language and/or accessibility needs.

Representation 406 allows an Adaptation Set to contain the same content encoded in different ways. In most cases, Representations will be provided in multiple screen sizes and bandwidths, allowing clients to request the highest quality content that they can play without waiting to buffer or wasting bandwidth on unneeded pixels. Representations can also be encoded with different codecs, allowing support for clients with different supported codecs or to provide higher quality Representations to newer clients while still supporting legacy clients. Multiple codecs can also be useful on battery-powered devices, where a device might chose an older codec having hardware support and lower battery usage, even if the device has software support for a newer codec. Representations are usually chosen automatically, but some players allow users to override the choices. A user might choose to make their own representation choices if, for example, they don't want to waste bandwidth in a particular video or if they're willing to have the video stop and buffer in exchange for higher quality.

Media segments are the actual media files that the DASH client plays. Segment 408 can provide media segment locations using a BaseURL for a single-segment Representation, a list of segments (SegmentList) or a template (SegmentTemplate). Segments can be in separate files, common for live streaming, or they can be byte ranges within a single file, which is common for static or "on-demand" media. The above portions of Service Manifest 400 describe what is being generated in the client manifest and thus correspond to similar elements in the client manifest.

New elements in the Service Manifest include Directives 410 and Packagers 412. Directives carry information for use by downstream packagers and can be used for routing of media catalogs or channels, adaptive transcoding and packaging, upload and CDN delivery, content protection, entitlements, advertising insertion, recording and storage. In at least one embodiment, Directive 410 can include the following:

General information related to the media/channel;
General guidance on how to package the streams;
Optional or mandatory instructions on how to package the streams;
Guidance on how to forward or route the streams; and
Optional or mandatory constraints on streams.

Additionally, Directive 410 can be any of a CBR Directive, CDN Directive, Transcode Directive, Package Directive, Upload Directive, Content Protection Directive, Content Storage Directive, Ad Insertion Directive, and Time-Shift Directive. A link-level constraint, for example, may specify the restriction on the use of links of a given network. In one example, a bandwidth constraint of a unicast connection may require that the links composing the path must have certain amount of free bandwidth available. A path constraint may specify an end-to-end QoS requirement on a single path. A tree constraint may specify an overall QoS requirement for the entire multicast tree. In one example, a delay constraint of a multicast connection may require that the longest end-to-end delay from the sender to any receiver in the tree must not exceed an upper bound. A directive related to Transport Control may indicate packaging differences that depend on the type of transport used for the last mile.

Packager 412 can provide information on upstream and/or downstream packager configuration, as well as other desired information regarding the packager. In at least one embodiment, packager attributes include location (e.g., region, data center name/etc.), address (e.g., a URL to access the packager), type (i.e., packager, transcoder, recorder, JIT, etc.), capabilities, identification (a unique packager ID), and owner (e.g., provider, CDN, content provider). In at least one embodiment, when a packager makes changes to Service Manifest 400, the changes, as well as identification of the packager making the changes, are documented in Packager field 412. Directives 410 and Packagers 412 can be applied to any level of Service Manifest 400, e.g. Directive 410A is applied to Representation 406A, but not to Representation 406B, or may apply to the entire MPD, e.g., Directives 410D, 410E and Packagers 412A, 412B. In addition to the new fields for Directives 410 and Packagers 412, individual elements of Service Manifest 400 can be protected. In at least one embodiment, a portion of Service Manifest 400, e.g., Directive 410D, which is mandatory, is signed for protection. In at least one embodiment the signature is the result of HMAC using SHA256 over the protected data in the service manifest. In at least one embodiment, all data contained between a signature start element and a signature end element is considered as the protected data. In at least one embodiment, signing is used to forbid a packager from editing a mandatory Directive 410. It should be appreciated that an enhanced MPD according to the teachings herein may be provided based on other protocols as well.

Service Manifest 400 can be generated by an SMC, such as SMC 204A. In at least one embodiment, when Headend Packager 204A uploads a media catalog or channel block, SMC 204 generates an initial service manifest for the media based on catalog data and an ingestion configuration for the channel or media. In at least one embodiment, SMC 204 can be used to generate service manifests for all of Packagers 202 in the network not only for Headend Packagers 202A, 202B. SMC 204 also assists in CBR for media catalog delivery and channel orchestration. SMCs are distributed across the network, rather than being centralized. Each of Central Data Center 102 and Regional Data Centers 104, 106 can have one or more SMCs. In at least one embodiment, SMC 204 is a separate entity; in at least one embodiment, SMC 204 is co-resident with a packager, e.g., SMC 102A is co-resident with Packager 104A.

In at least one embodiment, SMC 204A in conjunction with an associated packager, e.g., Packager 202A, performs CBR for media catalog and channel orchestration, using service manifests, ingestion configuration, routing tables and additional constraints to determine the routing, although this is not the only routing protocol that may be used. Constraints may be provided in directives carried in the service manifests; additional constraints can include packager resources, e.g., load, capacity, business logic, etc. As needs across the network change, allocations of channels and media catalogs to packagers can change over time. Therefore, dynamic mapping of media catalogs and channels is performed in response to subscriber request, e.g., when the subscriber turns on a given device. A client device can request a current channel or media catalog map from any network node. In at least one embodiment, a client device goes to the closest network node to request a current mapping for channels and media catalogs. The packager accesses a channel database and a media catalog database describing the locations of current media catalogs and channels, then applies CBR to determine an optimal packager to provide the media catalog or channel to the client device. The location of this optimal packager is provided to the client device, so that the client device is able to contact the selected packager and receive the requested media. Media delivery uses channel databases, media catalog databases and routing tables that are different than the databases and routing tables used for distribution and contain additional constraints used for media delivery. That is, routing tables used for distribution need information about available resources, such as storage and workload, while routing tables used for delivery consider constraints such as availability of bandwidth, content, JIT processing resources, and location with regard to the user.

The channel database and media catalog database contain respective channel or catalog distribution analytics (CDA) and other elements, such as publishing points, channel state, packager resources state, CDN origin, etc. The analytics may contain information regarding any number of factors that can affect distribution and delivery of ABR media. The information can include elements such as where channels and media are currently distributed, but can also contain elements that describe how the channels and media are being consumed, e.g., the number of look-ups made for a channel or media element, the number of clients consuming the channel/media, how the media is being consumed, e.g. via cellular, WiFi, wireline delivery, bitrates being used, etc. This information can be used to help the network remain cognizant of areas of the network needing attention or changes. For example, if a channel is being heavily used, a current packager may be reaching its limits for providing the channel. The network can determine, e.g., to shift the channel to another packager with more capabilities, to add an additional packager to spread the load being carried by the current packager, or to add more resources to the packager.

The routing to distribute channels and media catalogs is performed at the application level and uses the channel/media catalog databases. The routing protocol will have some similarities to the routing protocols used in other routing protocols, but lookup in the channel/media catalog databases does not just access the destination, as a router in a network might, but also looks at factors such as resource availability, e.g., the availability of bandwidth, storage, content and processing resources, and local optimization. In at least one embodiment, the media catalog and channel databases are also used to determine the feasibility of specific changes. It is envisioned that major mapping changes are made, e.g., once a day, so that it is possible to perform more complex calculations in pursuit of an optimal solution than might be possible if changes were made more frequently.

Optimization is increased by the exchange of information between SMCs or packagers, referred to herein as peering. This peering can exchange CDA, which is then stored in the channel and media catalog databases. CBR applied to the databases can result in appropriate routing tables for distribution. The channel routing table is used to route a channel or channel group to one or more packagers and the media catalog routing table is used to route a media catalog to one or more packagers. Media are constrained to a catalog, which is serviced by a group of packagers within certain constraints. A lookup failure for a packager may result in dynamic orchestration of one or more packagers to meet the demand.

The service manifest, along with the media and channel streams, traverses the network from headend-packagers towards downstream or edge packagers. Any packager may ingest one or more input service manifests and may generate one or more service manifests, e.g. to best provide area-specific content along different routes. In this manner, the service manifest is updated as the service manifest traverses the network. Examples of possible modifications include:

Adding or dropping a bitrate, e.g., to add or delete high definition;
Adding or dropping a format, such as adding DASH and dropping SS;
Adding or dropping a CDN, e.g. to meet specific business rules;
Adding or dropping an Audio Stream, e.g., adding Spanish language.

Several models of ABR media distribution may be used with CBR, including a Push Model, a Pull Model, and a Hybrid Model in which both push and pull are used and a Peer-to-Peer Model. In each of these models, a Packager, which may or may not be a Headend Packager, generates the Service Manifest for a channel or media catalog based on the Stream Manifest from a transcoder and an Initial Service Manifest from an SMC. The Service Manifest may also be generated using an ingestion configuration from a provider. The Packager uses the Stream Manifest and the Initial Service Manifest to generate a media ingestion configuration for itself. The Service Manifest generated by the Packager describes the output stream properties and directives associated with the channel or media catalog for use by other packagers. The Service manifest will be used by a downstream packager to generate a media ingestion configuration for itself and the downstream packager in turn generates an updated Service Manifest. The Service Manifest output by each Packager reflects the available streams, other resources, and updated directives based on the local configuration and business policies.

Figure 5A:
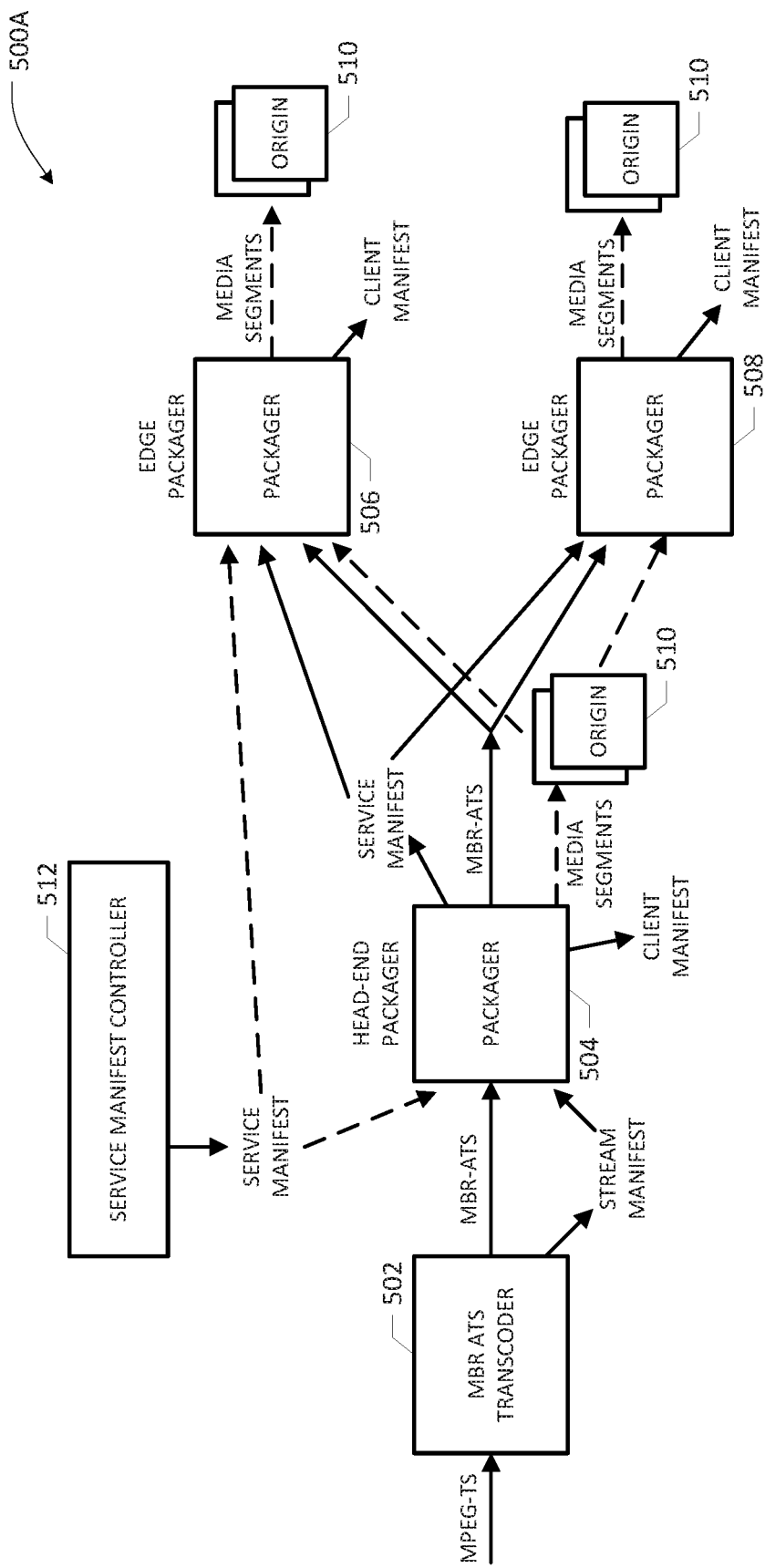
FIG. 5A depicts an example of a network using push distribution according to an embodiment of the disclosure.

In the Push Model shown in FIG. 5A MBR ATS Transcoder 502 sends the MBR ATS stream and the Stream Manifest to Headend Packager 504. The Service Manifest is first published by Headend Packager 504 in conjunction with SMC 512 and used by the downstream packagers, such as Packagers 506, 508. Headend Packager 504 uses the Service Manifest to serve Origin Servers 510 associated with the Headend Packager. The Service Manifest is updated and re-published by Packagers 506, 508 if additional packagers (not specifically shown) are used and is used to serve respective Origin Servers 510. The Channel Routing table is used to route the channel. In the Push Model, HeadendPackager 504 uses the Service Manifest and other information, such as the configurations of downstream Packagers 506, 508 to determine how to distribute channels within the network. The other information can include the channel, CDN, and recording configurations, content protection, service configuration, channel and/or packager Directives configuration, local business logic, etc. Headend Packager 504 can be any type of packager and may have any number of downstream packagers associated therewith. The edge packagers, such as Packagers 506, 508, use the Service Manifest and the local configuration to generate Client Manifest(s), may have input Stream Manifests and performs necessary transformation functions. Packagers 506, 508 may also use specific mandatory directives, perform packager lookup for channel and media catalog delivery using the Channel or Catalog Routing table to find the right packager for client use, and provide outputs such as HLS, SS, DASH.

Figure 5B:
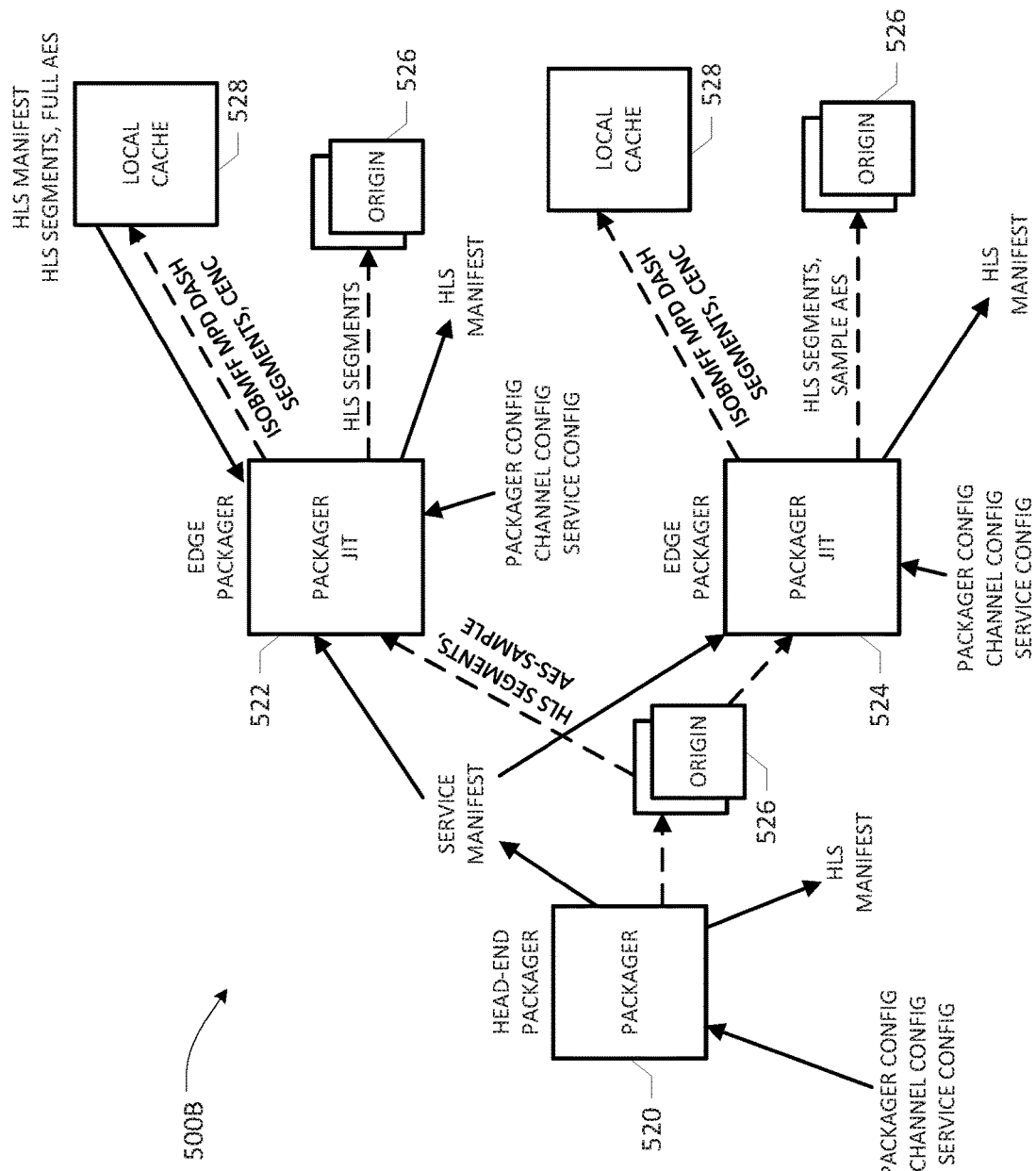
FIG. 5B depicts an example of a network using pull distribution according to an embodiment of the disclosure.
Figure 6A:
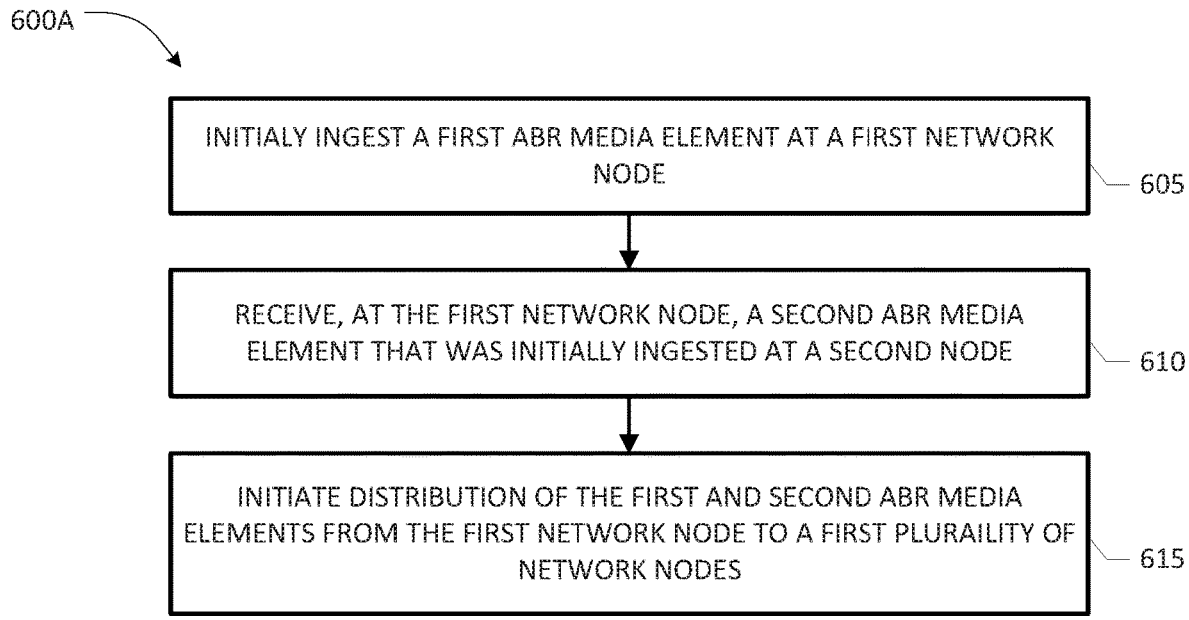
FIGS. 6A-6L depict a flowchart for a method for distributing ABR media in a network according to an embodiment of the present patent disclosure.
Figure 6B:
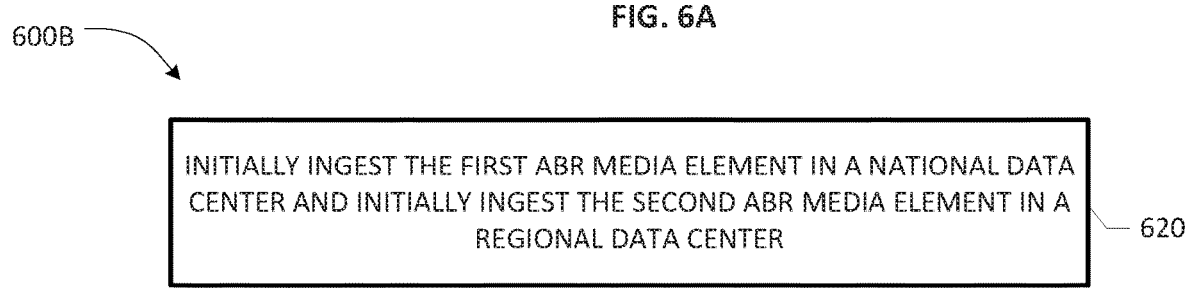
Figure 6C:
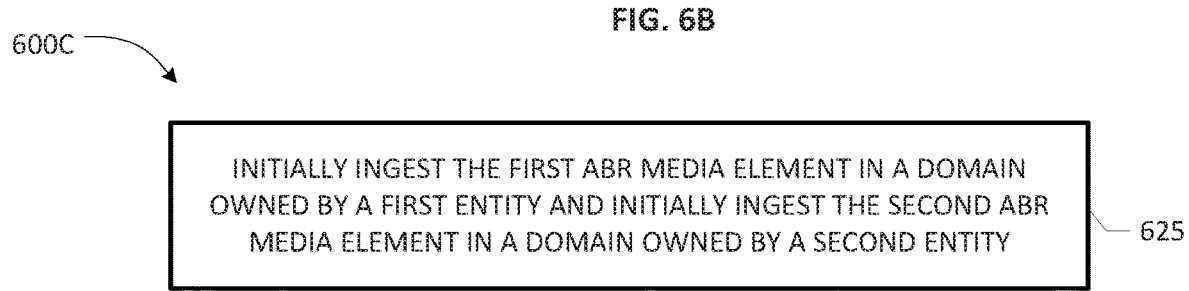
Figure 6D:
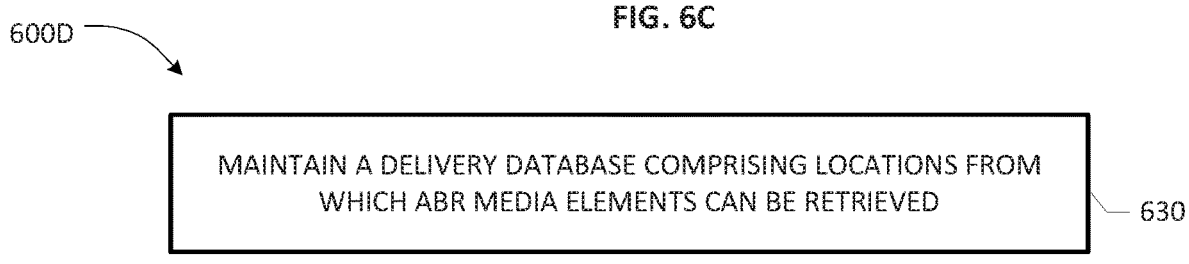
Figure 6E:
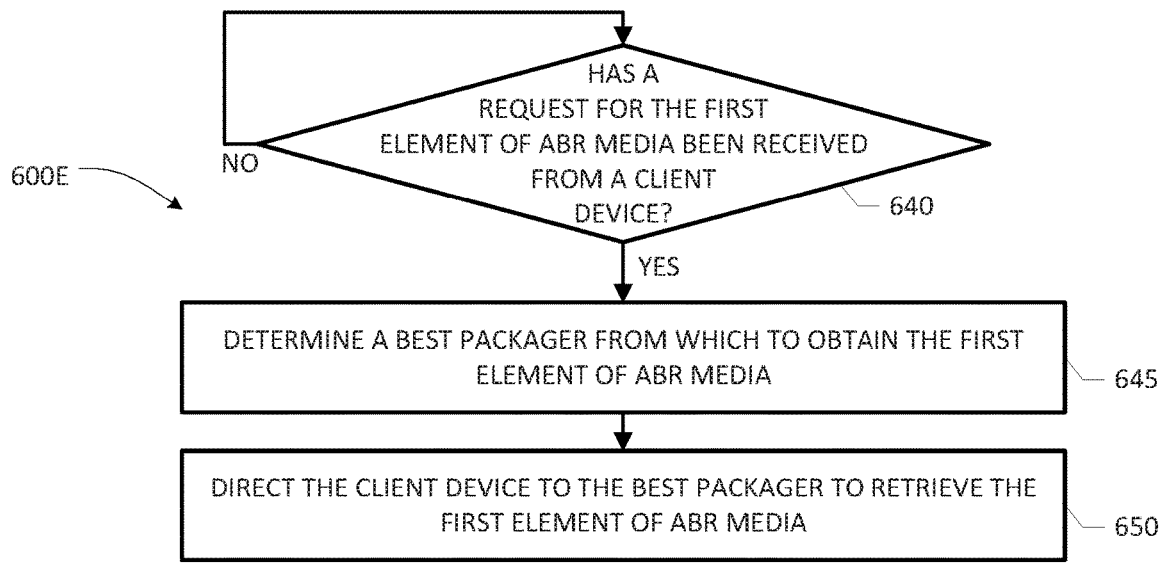
Figure 6F:
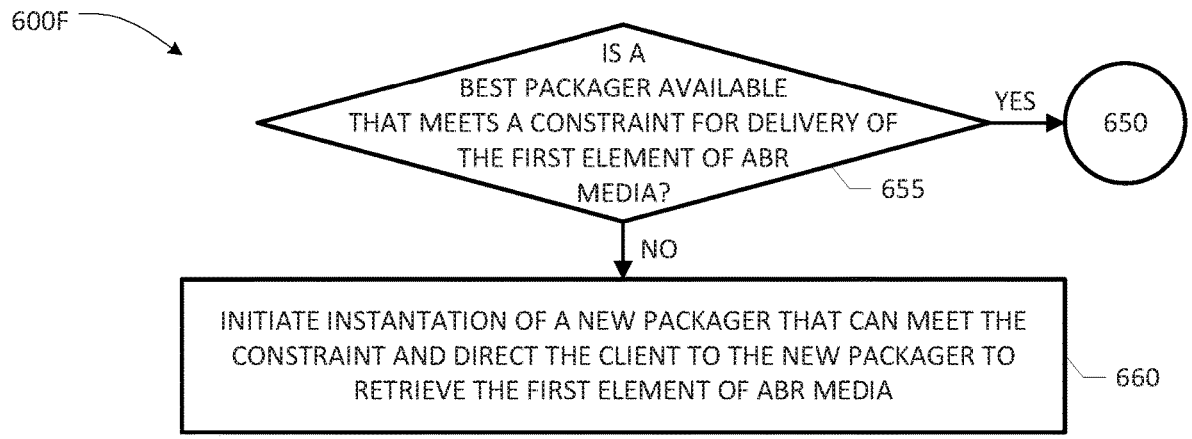
Figure 6G:
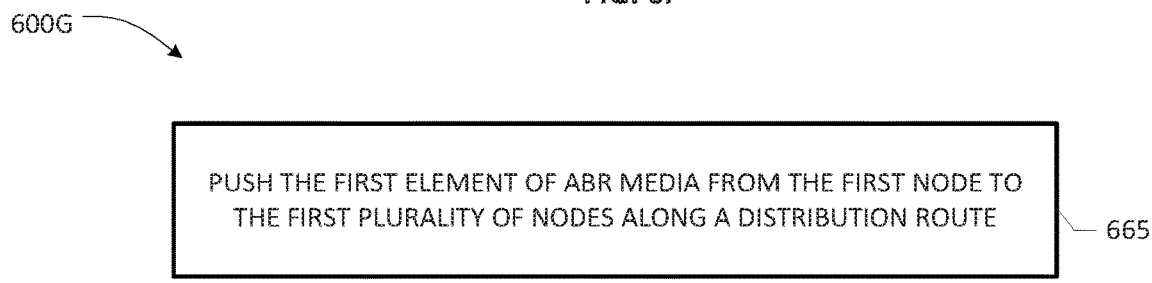
Figure 6H:
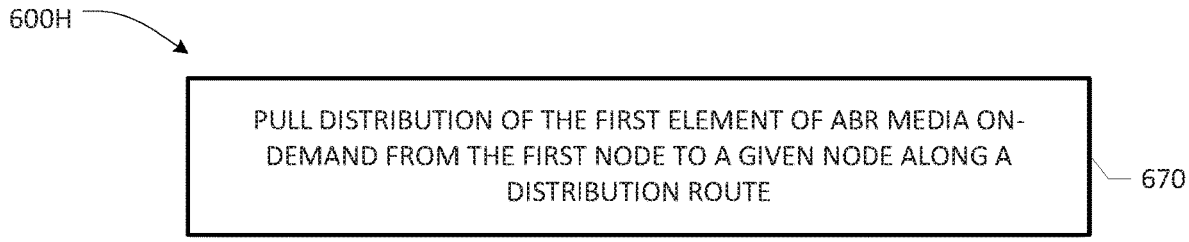
Figure 6I:
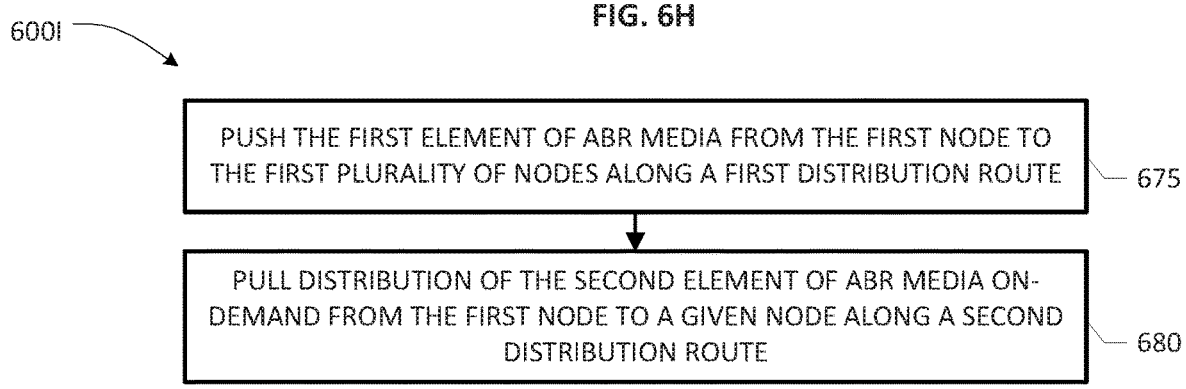
Figure 6J:
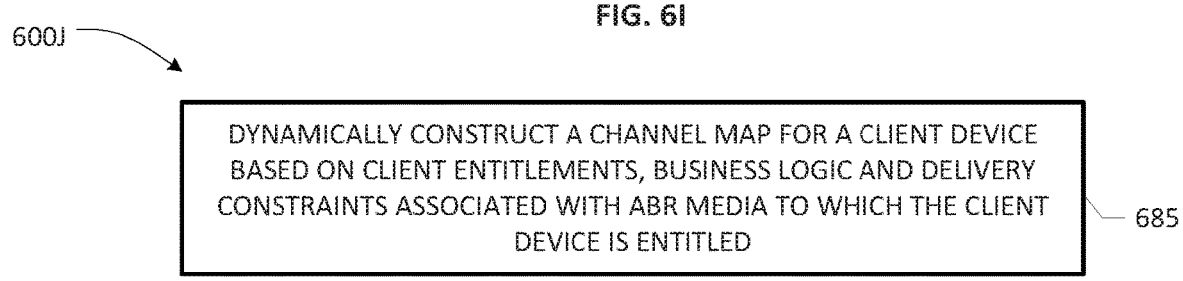
Figure 6K:
Figure 6L:
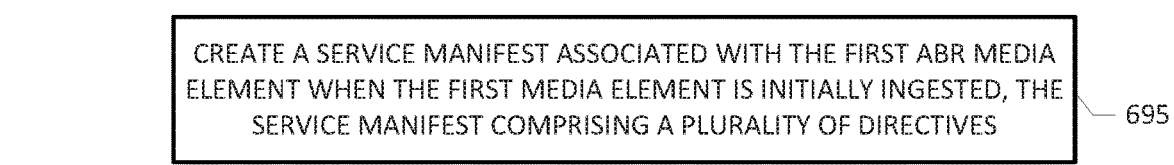
Figure 7A:
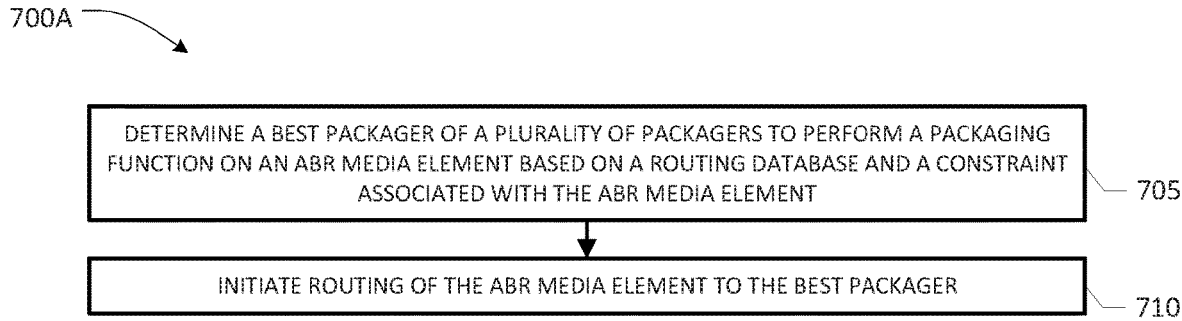
FIGS. 7A-7M depict a flowchart for a method for distributing ABR media in a network according to an embodiment of the present patent disclosure.
Figure 7B:
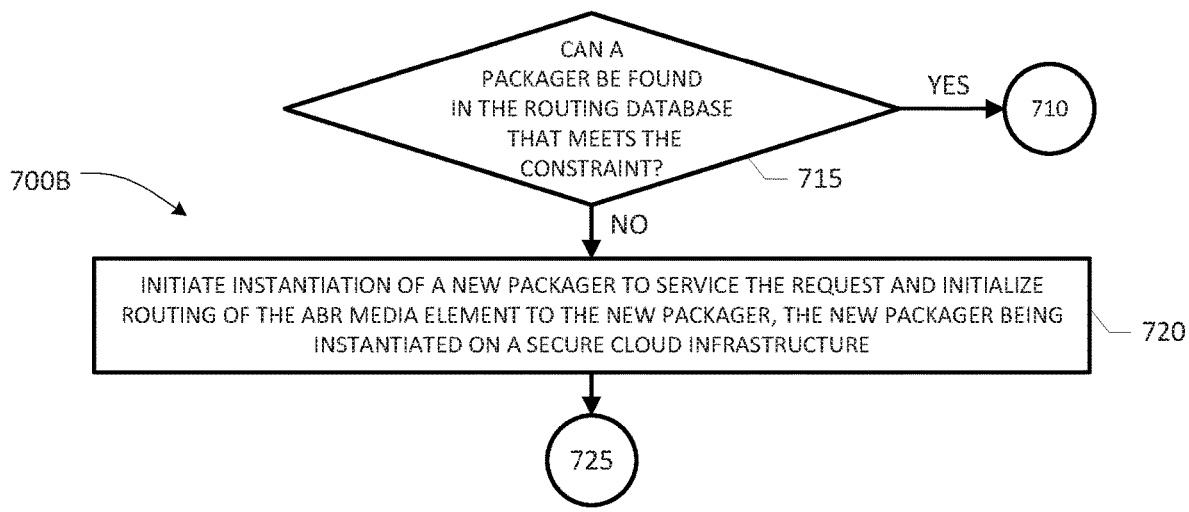
Figure 7C:
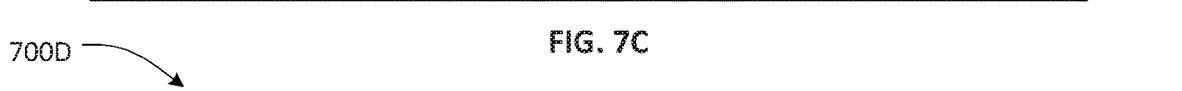
Figure 7D:
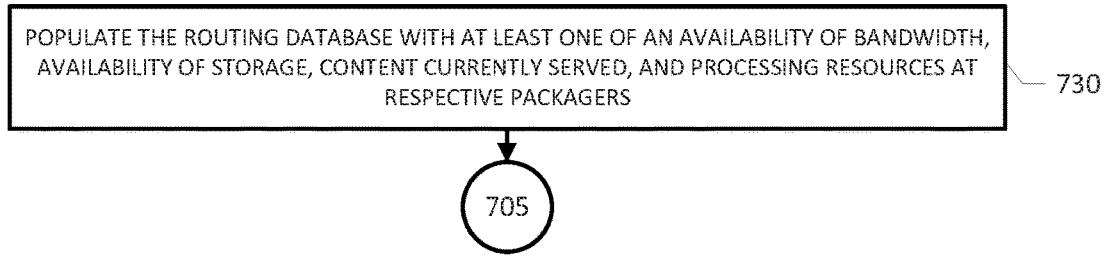
Figure 7E:
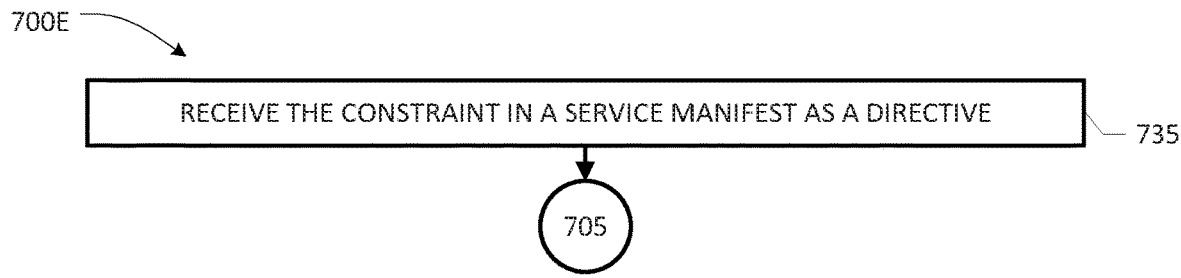
Figure 7F:
Figure 7G:
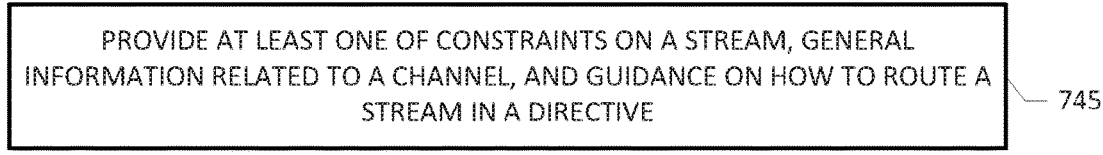
Figure 7H:
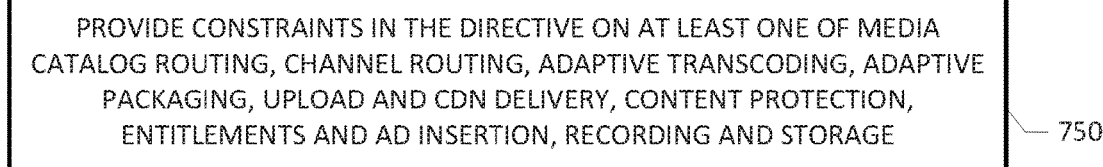
Figure 7I:
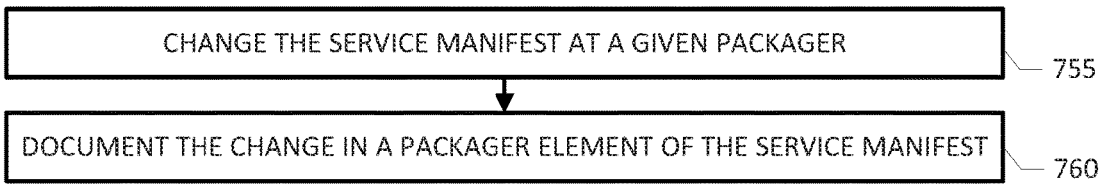
Figure 7J:
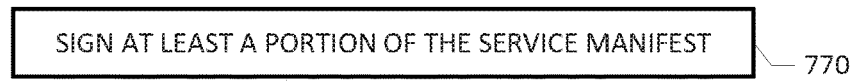
Figure 7K:
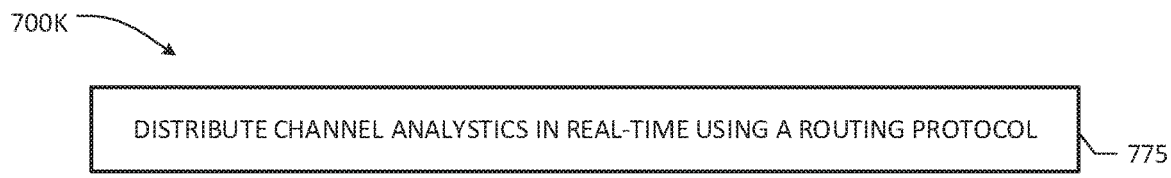
Figure 7L:
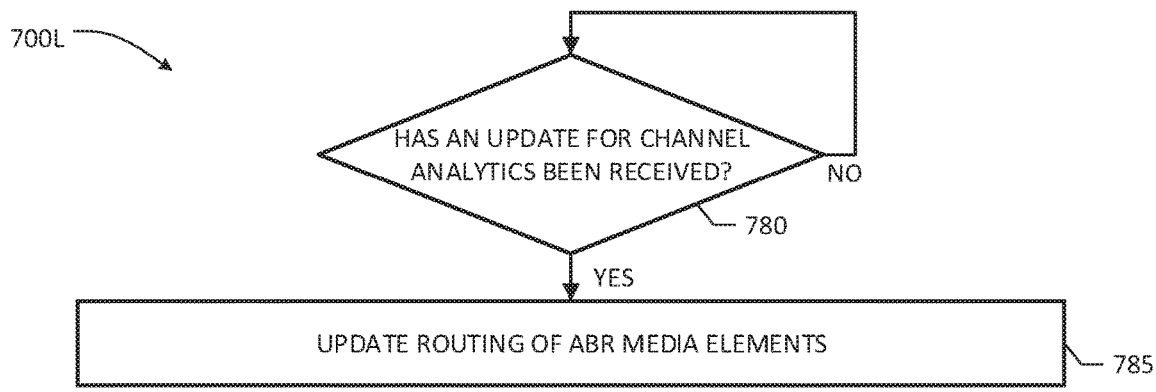
Figure 7M:
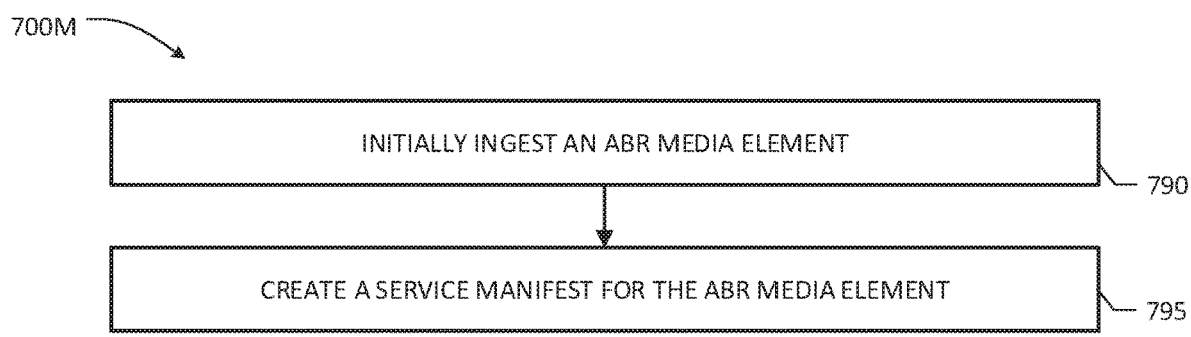

In the Pull Model shown in FIG. 5B, Service Manifests and media streams traverse from upstream packagers, such as Headend Packager 520, downstream when pulled from the edge packagers, such as JIT Packagers 522. In this model, Edge Packagers 522, 524 initiate the Service Manifest Requests based on the local conditions and using the channel or catalog routing table. Directives for packagers in the pull model are not mandatory. Edge Packagers 522, 524 can operate in two modes, using both JIT and Ahead of Time adaptations for channel and media catalog provisioning, e.g., performing ahead-of-time provisioning for channels and JIT for VoD. A Hybrid Model can combine the Push and Pull model. In at least one embodiment using a Hybrid Model, major channel groups and popular media catalogs can be pushed to regional data centers or beyond, while channels and media catalogs that only receive occasional use are pulled from a distant packager only when requested.

In a Peer-to-Peer Model, multiple head-ends packagers can ingest a particular media catalog or channel bundle, so that an edge packager doesn't know where to get the media/channel. The edge packager performs an expanding lookup process for the desired media with neighbors. If no neighbors have the desired media, the request can go all the way up the hierarchy to a headend packager containing the media. Along this expanding lookup process, however, a neighboring packager that has the media/channel can send the channel or media-catalog down to the edge packager.

In each model, channel and media catalog mapping is performed real time, based on subscriber demand and business logic. Every region can have a different channel guide mapping, with some media being served, for example, from a national data center while other media is served from the regional centers. Channels and media catalogs can be served from different set of packagers, as desired. Given the architecture and distribution disclosed here, especially the on demand real time infrastructure and dynamic orchestration of both the packager network and the channels and media catalogs carried by the packager network, channel to packager mapping is much more dynamic than previously seen. Packager nodes can be added or deleted, with CBR to help to identify optimal locations and/or nodes. CBR can indicate the need for packagers to be reconfigured to meet changing demands and additional constraints, e.g., for channel routing, can be imposed on packagers. Failure of packager lookup in routing tables can trigger channel and/or media catalog orchestration, resulting in the orchestration of new packagers. Edge packagers therefore perform dynamic look up in response to user requests in order to determine a packager to serve a channel or VoD to the user.

Turning next to FIGS. 6A-6L, these figures disclose a flowchart for a Method 600 for distributing ABR media in a network. In Method 600A, a first network node ingests 605 a first ABR media element. The first network node further receives 610 a second ABR media element that was initially ingested at a second node. The first network node initiates 615 distribution of the first and second ABR media elements to a first plurality of network nodes. Other actions can be performed as needed and are not performed in any particular order unless otherwise stated. In Method 600B, the first ABR media element is initially ingested 620 in a national data center and the second ABR media element is initially ingested in a regional data center. In Method 600C, the first ABR media element is initially ingested 620 in a domain owned by a first entity and the second ABR media element is initially ingested in a domain owned by a second entity. In Method 600D, the network maintains 630 a delivery database comprising locations from which ABR media elements can be retrieved.

In Method 600E, a node determines 640 whether a request for the first element of ABR media has been received from a client device. If no request has been received, the node continues with other operations and waits for a request. If a request has been received, the node determines 645 a best packager from which to obtain the first element of ABR media and directs 650 the client device to the best packager to retrieve the first element of ABR media. In at least some embodiments, Method 600F is performed as part of action 645 and determines 655 whether a best packager is available that meets a constraint for delivery of the first element of ABR media. If a best packager is available, then action 650 is performed; otherwise the network initiates 660 instantiation of a new packager that can meet the constraint and directs the client to the new packager to retrieve the first element of ABR media.

In at least one embodiment shown in Method 600G, the first node pushes 665 the first element of ABR media to the first plurality of nodes along a distribution route. In at least one embodiment shown in Method 600H, a node in the first plurality of network nodes pulls 670 distribution of the first element of ABR media on-demand from the first node along a distribution route. In at least one embodiment shown in Method 600I, the first node pushes 675 the first element of ABR media to the first plurality of nodes along a first distribution route and a node in the first plurality of network nodes pulls 680 distribution of the second element of ABR media on-demand from the first node along a second distribution route.

In Method 600J, a node dynamically constructs 685 a channel map for a client device, based on client entitlements, business logic and delivery constraints associated with ABR media to which the client device is entitled. In Method 600K, network nodes exchange 690 summary service manifests across boundaries between one of different regions of a provider and different providers. In Method 600L, the system creates a service manifest associated with the first ABR media element when the first ABR media element is initially ingested, the Service Manifest comprising a plurality of directives.

FIGS. 7A-7M disclose a flowchart for a method for distributing ABR media in a network. In Method 700A the network determines 705 a best packager of a plurality of packagers to perform a packaging function on an ABR media element based on a routing database and a constraint associated with the ABR media element and initiates 710 routing of the ABR media element to the best packager. In at least one embodiment, Method 700B is performed as part of actions 705 and determines 715 whether a packager can be found in the routing database that meets the constraint. If a packager is found, the method moves to element 710; otherwise the method initiates 720 instantiation of a new packager to service the request and initializes routing of the ABR media element to the new packager. The new packager is instantiated on a secure cloud infrastructure. If a new packager is instantiated, Method 500C is performed to authenticate 725 the new packager.

The remaining actions can be performed as needed and are not performed in any particular order unless otherwise stated. Method 700D can be performed as necessary and populates 730 the routing database with at least one of an availability of bandwidth, availability of storage, content currently served, and processing resources at respective packagers. Method 700E is performed prior to the actions of Method 700A and receives 735 the constraint in a service manifest as a directive. In at least one embodiment shown in Method 700F, the system requires 740 the directive to be met. In at least one embodiment shown in Method 700G, the system provides 745 at least one of constraints on a stream, general information related to a channel, and guidance on how to route a stream in a directive. In at least one embodiment shown in Method 700H, the system provides 750 constraints in the directive on at least one of media catalog routing, channel routing, adaptive transcoding, adaptive packaging, upload and CDN delivery, content protection, entitlements and ad insertion, recording and storage. In at least one embodiment shown in Method 700I, a given packager changes 755 the service manifest and documents 760 the change in a packager element of the service manifest. In at least one embodiment shown in Method 700J, at least a portion of the service manifest is signed 770.

In at least one embodiment shown in Method 700K, the network distributes 775 channel analytics in real-time using a routing protocol. In at least one embodiment shown in Method 700L, the network receives 780 an update for channel analytics and updates 785 routing of ABR media elements. In at least one embodiment shown in Method 700M, a network node initially ingests 790 an ABR media element and creates 795 a service manifest for the ABR media element.

The disclosed systems, devices and methods can facilitate many innovative ways to present digital media to users in a managed network. One example of this is what might be called "follow-me" media, in which a subscriber who is travelling, e.g., to another state or country, can watch their regular programming in another location. In this application, a subscriber who lives, for example, in Texas, is travelling in Florida, but wants to access the media and channels that they usually watch at home and with the same high-quality experience. The subscriber is identified to the network in the new location and their entitlements and media preferences are retrieved. Because of the new region the subscriber is visiting, the channel block in the Florida region has a somewhat different lineup than does the Texas region. A packager near the subscriber is able to perform a lookup to determine a packager, e.g., in Texas, that can supply the desired channel block and directs the subscriber's client device to the distant packager. The subscriber can then access their accustomed shows, generally with local advertising inserted. If a large number of Texans are currently visiting in Florida and are requesting the same channel block, the network may determine that the amount of traffic between the two regions is excessive. The network can then choose to instantiate a new packager in the Florida region that receives one copy of the channel block and serves all the subscribers in Florida who request this channel block. The subscribers can continue to access the Texas packager until the new Florida packager is instantiated; then the next time the UE requests the next ABR segment, the UE is directed to the new packager.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

Furthermore, as noted previously, at least a portion of an example network architecture disclosed herein may be virtualized as set forth above and architected in a cloud-computing environment comprising a shared pool of configurable virtual resources. For instance, various pieces of software, e.g., content encoding schemes, DRMs, segmentation mechanisms, media asset package databases, etc., as well as platforms and infrastructure of a video service provider network may be implemented in a service-oriented architecture, e.g., Software as a Service (SaaS), Platform as a Service (PaaS), infrastructure as a Service (IaaS) etc., with multiple entities providing different features of an example embodiment of the present invention, wherein one or more layers of virtualized environments may be instantiated on commercial off the shelf (COTS) hardware. Skilled artisans will also appreciate that such a cloud-computing environment may comprise one or more of private clouds, public clouds, hybrid clouds, community clouds, distributed clouds, multiclouds and interclouds (e.g., "cloud of clouds", and the like.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. At least one or more drawing figures in the accompanying materials show various structural components and blocks of a network node or element, including one or more processors, interfaces, and suitable memory with program instructions, configured to perform or effectuate one or more embodiments above. In similar fashion, at least one or more drawing figures in the accompanying materials show various structural components and blocks of a subscriber end station or device, including one or more processors, interfaces, and suitable memory with program instructions, configured to perform or effectuate one or more embodiments above.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added or inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for distributing adaptive bitrate (ABR) media in a network, the method comprising:

receiving, from a first packager in a first region at a second packager in a second region, a first channel and a first service manifest for the first channel, the first service manifest comprising one or more directive elements and one or more packager elements, the one or more directive elements providing constraints for the first channel, wherein the first packager interacts with a first service manifest controller to generate the first service manifest based on a stream manifest from a transcoder and an initial service manifest and the first packager distributes the first channel and the first service manifest to a first content delivery network in the first region;

the second packager interacting with a second service manifest controller to generate a second service manifest that is updated from the first service manifest to provide updated directive elements based on local configuration and business policy and to further provide modifications to the first channel within the constraints; and the second packager distributing the first channel and the second service manifest to a second content delivery network in the second region;

wherein the second packager documents the modifications and identification of the second packager in the one or more packager elements.

2. The method as recited in claim 1 wherein the modifications comprise a substitution for a first program on the first channel.

3. The method as recited in claim 2 wherein the first program is blacked out in the second region.

4. The method as recited in claim 2 wherein the substitution is a broadcast of a local event.

5. The method as recited in claim 1 wherein the modifications comprise local insertion of advertising.

6. The method as recited in claim 1 further comprising the second packager providing broadcast of a local event on a second channel that is time-limited.

7. The method as recited in claim 1 wherein the first packager is a headend packager.

8. An apparatus for distributing adaptive bitrate (ABR) media in a network, the apparatus comprising:

one or more processors; and a non-transitory computer-readable medium having program instructions which are executable by the one or more processors, the program instructions including instructions for:

receiving, from a first packager in a first region, a first channel and a first service manifest for the first channel, the first service manifest comprising one or more directive elements and one or more packager elements, the one or more directive elements providing constraints for the first channel, wherein the first packager interacts with a first service manifest controller to generate the first service manifest based on a stream manifest from a transcoder and an initial service manifest and the first packager distributes the first channel and the first service manifest to a first content delivery network in the first region;

interacting with a second service manifest controller to generate a second service manifest that is updated from the first service manifest to provide updated directive elements based on local configuration and business policy and to further provide modifications to the first channel within the constraints; and distributing the first channel and the second service manifest to a second content delivery network in the second region;

wherein the second packager documents the modifications and identification of the second packager in the one or more packager elements.

9. The apparatus for distributing ABR media as recited in claim 8 wherein the apparatus is a second packager in a second region.

10. The apparatus for distributing ABR media as recited in claim 9 wherein the program instructions include instructions for providing broadcast of a local event on a second channel that is time-limited.

11. The apparatus for distributing ABR media as recited in claim 8 wherein the modifications comprise a substitution for a first program on the first channel.

12. The apparatus for distributing ABR media as recited in claim 11 wherein the apparatus is in a second region and the first program is blacked out in the second region.

13. The apparatus for distributing ABR media as recited in claim 11 wherein the substitution is a broadcast of a local event.

14. The apparatus for distributing ABR media as recited in claim 8 wherein the modifications comprise local insertion of advertising.

15. The apparatus for distributing ABR media as recited in claim 8 wherein the first packager is a headend packager.

16. A system for distributing adaptive bitrate (ABR) media in a network, the system comprising:

a first packager in a first region coupled to interact with a first service manifest controller to generate a first service manifest for a first channel based on a stream manifest from a transcoder and an initial service manifest, the first service manifest comprising one or more directive elements and one or more packager elements, the one or more directive elements providing constraints for the first channel, wherein the first packager distributes the first channel to a first content delivery network in the first region; and a second packager in a second region coupled to receive the first channel from the first packager and to interact with a second service manifest controller to generate a second service manifest that is updated from the first service manifest to provide updated directive elements based on local configuration and business policy and to further provide modifications to the first channel within the constraints, the second packager further coupled to distribute the first channel using the second service manifest to a second content delivery network in the second region;

wherein the second packager documents the modifications and identification of the second packager in the one or more packager elements.

17. The system for distributing ABR media in a network as recited in claim 16 wherein the modifications comprise the second packager substituting a first program for a second program on the first channel.

18. The system for distributing ABR media in a network as recited in claim 16 wherein the second packager provides broadcast of a local event on a time-limited channel.

* * * * *